(12) United States Patent
Rigo et al.

(10) Patent No.: US 11,148,379 B2
(45) Date of Patent: Oct. 19, 2021

(54) ASSEMBLY INTENDED FOR A TIRE AND INCLUDING WOVEN OR KNITTED FABRIC(S) INCLUDING PRE-ADHERED WIRE ELEMENTS

(71) Applicant: COMPAGNIE GENERALE DES ETABLISSEMENTS MICHELIN, Clermont-Ferrand (FR)

(72) Inventors: Sébastien Rigo, Clermont-Ferrand (FR); Florian Vilcot, Clermont-Ferrand (FR); Nicole Dajoux, Clermont-Ferrand (FR); Magaly Brousseau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 368 days.

(21) Appl. No.: 15/780,367

(22) PCT Filed: Dec. 15, 2016

(86) PCT No.: PCT/FR2016/053450
§ 371 (c)(1),
(2) Date: May 31, 2018

(87) PCT Pub. No.: WO2017/103491
PCT Pub. Date: Jun. 22, 2017

(65) Prior Publication Data
US 2018/0361791 A1  Dec. 20, 2018

(30) Foreign Application Priority Data
Dec. 17, 2015 (FR) ...................................... 1562630

(51) Int. Cl.
*B29D 30/02* (2006.01)
*B29D 30/24* (2006.01)
(Continued)

(52) U.S. Cl.
CPC ........... *B29D 30/02* (2013.01); *B29D 30/242* (2013.01); *B29D 30/40* (2013.01); *B60C 7/125* (2013.01); *B60C 7/14* (2013.01); *B60C 2007/146* (2013.01)

(58) Field of Classification Search
CPC .... B60C 7/00; B60C 7/10; B60C 7/12; B60C 7/125; B60C 7/14; B60C 2007/146;
(Continued)

(56) References Cited

U.S. PATENT DOCUMENTS

| 1,426,763 A | 8/1922 | O'Bannon |
| 2,502,101 A * | 3/1950 | Morgan ................. D03D 11/02 139/384 R |

(Continued)

FOREIGN PATENT DOCUMENTS

| CN | 101318450 A | 12/2008 |
| WO | WO 2017/005713 A1 | 1/1917 |

(Continued)

OTHER PUBLICATIONS

International Search Report issued by WIPO dated Mar. 30, 2017, in connection with International Application No. PCT/FR2016/053450 (in English and in French).

(Continued)

*Primary Examiner* — Robert C Dye
*Assistant Examiner* — Sedef E Paquette
(74) *Attorney, Agent, or Firm* — Venable LLP

(57) ABSTRACT

A process is provided for manufacturing a tire assemblage that includes a first woven or knitted fabric including first threadlike elements, a second woven or knitted fabric including second threadlike elements, and a bearing structure including bearing elements connecting the first and second woven or knitted fabric together. The process includes coating each first threadlike element with a layer of (Continued)

a first adhesive composition and coating each second threadlike element with a layer of a second adhesive composition, heat treating each coated first threadlike element and each coated second threadlike element to crosslink the first adhesive composition and the second adhesive composition, and assembling the bearing elements with each heat-treated and coated first and second threadlike element to form part or all of the tire assemblage.

13 Claims, 9 Drawing Sheets

(51) Int. Cl.
B60C 7/14 (2006.01)
B29D 30/40 (2006.01)
B60C 7/12 (2006.01)

(58) Field of Classification Search
CPC ... B60C 17/04; B60C 17/06; B60C 2017/068; B60C 9/18; B60C 9/1807; B60C 2009/1814; B29D 30/02; B29D 30/242; B29D 30/40; B29D 2030/383
USPC .......................... 152/527; 156/394.1
See application file for complete search history.

(56) References Cited

U.S. PATENT DOCUMENTS

| | | | |
|---|---|---|---|
| 2,506,861 A | | 5/1950 | Drennan .................. 152/249 |
| 3,979,536 A | | 9/1976 | Neville et al. |
| 4,157,107 A | | 6/1979 | Cataldo .................. 152/330 RF |
| 4,235,270 A | | 11/1980 | Kahaner et al. |
| 5,407,701 A | * | 4/1995 | Reuter .................. B60C 9/0042 427/177 |
| 8,770,242 B2 | | 7/2014 | Deal |
| 2003/0121581 A1 | * | 7/2003 | Thompson .................. B60C 7/22 152/301 |
| 2006/0033231 A1 | * | 2/2006 | Reuter .................. B60C 9/0042 264/171.24 |
| 2010/0307653 A1 | | 12/2010 | Delfino et al. |
| 2010/0319828 A1 | | 12/2010 | Deal |
| 2014/0235124 A1 | | 8/2014 | Doisneau et al. |
| 2014/0235125 A1 | * | 8/2014 | Doisneau .................. C09J 109/10 442/149 |
| 2014/0308864 A1 | | 10/2014 | Doisneau et al. |
| 2016/0121663 A1 | * | 5/2016 | Sportelli .................. B60C 15/0653 152/542 |
| 2016/0251550 A1 | | 9/2016 | Michoud et al. |
| 2018/0154694 A1 | * | 6/2018 | Orlewski .................. B60C 7/18 |
| 2018/0361790 A1 | | 12/2018 | Rigo et al. |

FOREIGN PATENT DOCUMENTS

| | | | | |
|---|---|---|---|---|
| WO | 02/083435 A1 | 10/2002 | | |
| WO | 2005/007422 A1 | 1/2005 | | |
| WO | 2009/087291 A2 | 7/2009 | | |
| WO | WO-2012098130 A1 | * | 7/2012 | ............ D03D 11/02 |
| WO | 2013/017421 A1 | 2/2013 | | |
| WO | 2013/017422 A1 | 2/2013 | | |
| WO | 2013/017423 A1 | 2/2013 | | |
| WO | 2015/007641 A1 | 1/2015 | | |
| WO | 2015/007642 A1 | 1/2015 | | |

OTHER PUBLICATIONS

Written Opinion issued by WIPO dated Jun. 22, 2017, in connection with International Application No. PCT/FR2016/053450 (in French; presently no English translation is available).
Preliminary Search Report issued by INPI (French Patent Office) dated Aug. 29, 2016, in connection with French Application No. 1562630 (in French; presently no English translation is available).

* cited by examiner

ASSEMBLY INTENDED FOR A TIRE AND INCLUDING WOVEN OR KNITTED FABRIC(S) INCLUDING PRE-ADHERED WIRE ELEMENTS

FIELD OF THE INVENTION

Related Art

A conventional tire is a torus-shaped structure intended to be fitted onto a wheel rim, pressurized by an inflation gas and squashed on the ground under the action of a load. At any point on its running surface, which is intended to come into contact with the ground, the tire has a double curvature: a circumferential curvature and a meridian curvature. Circumferential curvature is understood to mean a curvature in a circumferential plane, defined by a circumferential direction, tangent to the running surface of the tire in the rolling direction of the tire, and a radial direction, perpendicular to the axis of rotation of the tire. Meridian curvature is understood to mean a curvature in a meridian or radial plane, defined by an axial direction, parallel to the axis of rotation of the tire, and a radial direction, perpendicular to the axis of rotation of the tire.

In that which follows, the expression "radially interior or respectively radially exterior" is understood to mean "closer to or respectively further away from the axis of rotation of the tire". The expression "axially interior or respectively axially exterior" is understood to mean "closer to or respectively further away from the equatorial plane of the tire", the equatorial plane of the tire being the plane which passes through the middle of the running surface of the tire and is perpendicular to the axis of rotation of the tire.

It is known that the flattening of the tire on horizontal ground, in a circumferential plane and in a meridian plane, is conditioned by the values of the circumferential and meridian radii of curvature respectively, at the points of the running surface which are positioned at the limits of the patch for contact of the tire with the ground. This flattening is all the easier the larger these radii of curvature, that is to say the smaller the curvatures, since the curvature at a point, in the mathematical sense, is the inverse of the radius of curvature. It is also known that the flattening of the tire has an impact on the performance qualities of the tire, in particular the rolling resistance, grip, wear and noise.

Consequently, a person skilled in the art, who is a tire specialist, seeking to obtain a good compromise between the expected performance qualities of the tire, such as wear, grip, endurance, rolling resistance and noise, this list not being exhaustive, has developed alternative solutions to conventional tires in order to optimize the flattening thereof.

A conventional tire of the state of the art generally has a high meridian curvature, that is to say a small meridian radius of curvature, at the axial ends of the tread, known as shoulders, when the tire, fitted onto its mounting rim and inflated to its recommended operating pressure, is subjected to its service load. The mounting rim, the operating pressure and the service load are defined by standards, such as, for example, the standards of the European Tire and Rim Technical Organisation (ETRTO).

A conventional tire bears the load applied, essentially by the axial ends of the tread, or shoulders, and by the sidewalls connecting the tread to beads which ensure the mechanical connection of the tire to its mounting rim. It is known that meridian flattening of a conventional tire, with a small meridian curvature at the shoulders, is generally difficult to obtain.

The document U.S. Pat. No. 4,235,270 describes a tire having an annular body made of elastomeric material, comprising a radially exterior cylindrical part, at the periphery of the tire, which can comprise a tread, and a radially interior cylindrical part which is intended to be fitted onto a wheel rim. A plurality of walls which are spaced apart along the circumferential direction extend from the radially interior cylindrical part to the radially exterior cylindrical part and provide for the bearing of the load. Moreover, sidewalls can connect the two respectively radially interior and radially exterior cylindrical parts in order to form, in combination with the tread and the sidewalls, a closed cavity and to thus allow the tire to be pressurized. However, such a tire has a high weight, in comparison with a conventional tire, and, due to its heavy nature, is liable to dissipate a large amount of energy, which can limit its endurance and thus its lifetime.

The document WO 2009087291 describes a tire structure comprising two annular shells, one an internal, or radially interior, annular shell and one an external, or radially exterior, annular shell respectively, which are connected by two sidewalls and by a bearing structure. According to this invention, the bearing structure is pressurized and divides the annular volume of the tire into a plurality of compartments or cells, and the sidewalls are connected to or integrated with the bearing structure. In this case, the load applied is borne both by the bearing structure and the sidewalls. The distribution of pressure in the contact patch is not homogeneous in the axial width of the contact patch, with raised pressures at the shoulders due to the difficulty of meridian flattening because of the connection between the sidewalls and the bearing structure. These raised pressures at the shoulders are liable to generate significant wear of the shoulders of the tread.

The document WO 2005007422 describes a compliant wheel comprising a compliant band and a plurality of spokes extending radially inwards from the compliant band to a hub. The compliant band is intended to adapt to the surface of contact with the ground and to envelop obstacles. The spokes transmit the load borne between the compliant band and the hub, by virtue of the spokes which are not in contact with the ground being tensioned. Such a compliant wheel requires optimization of the distribution of the spokes in order to guarantee a substantially cylindrical periphery. Moreover, a compliant wheel has a relatively high weight in comparison with a conventional tire.

BRIEF DESCRIPTION OF EMBODIMENTS OF THE INVENTION

The object of the present invention is to provide a tire assemblage which makes possible improved flattening of the tread when the tire is subjected to a load.

Process for the Manufacture of an Assemblage According to the Invention

To this end, a subject-matter of the invention is a process for the manufacture of a tire assemblage, the assemblage comprising:
  a first woven or knitted fabric comprising one or more first threadlike elements,
  a second woven or knitted fabric comprising one or more second threadlike elements,
  a bearing structure comprising bearing elements connecting the first and second woven or knitted fabric(s) together,
  in which process:
  each first threadlike element is coated with at least one layer of a first adhesive composition and each second threadlike element is coated with at least one layer of a second adhesive composition, then, each first and second coated threadlike element is heat treated, so as to crosslink each first and second adhesive composition, then, each first and second coated and heat-treated threadlike element is assembled with the bearing elements so as to form the assemblage.

The principle of a tire assemblage according to the invention is to have a bearing structure comprising bearing elements connecting the first and second woven or knitted fabric(s) and able, once the assemblage is arranged in the tire, to bear the load applied to the tire by the tensioning of a portion of the bearing elements positioned outside the contact patch, the bearing elements positioned in the contact patch being subjected to buckling as subjected to a compressive load and thus not contributing towards the bearing of the load applied.

By virtue of the process according to the invention, the geometric properties of the assemblage are not modified during the stage of heat treatment which makes it possible to crosslink each first and second adhesive composition. This is because, on heat treating the threadlike elements coated with an adhesive composition, a variation in their length but also their mechanical properties, in particular in elongation, is observed. Thus, by forming the assemblage and by then carrying out the stage of heat treatment of the coated first and second threadlike elements, the geometry of each first and second threadlike element but also the geometry of the assemblage, and thus the operation expected once the assemblage is in the tire, would both be modified. In the process according to the invention, as the stages of individual coating and of individual heat treatment of each first and second threadlike element are carried out before the stage of formation of the assemblage, the individual geometric properties of each first and second threadlike element are modified before the stage of formation of the assemblage, which assembling stage is carried out while taking into account the variations undergone by each threadlike element. Thus, the expected operation of the assemblage in a tire is indeed obtained.

In addition, the fact of carrying out the stages of individual coating and of individual heat treatment of each first and second threadlike element before the stage of formation of the assemblage makes it possible to avoid the formation of points of attachment at the intertwinings of the threadlike elements on each first and second woven or knitted fabric.

Several embodiments can be envisaged. In a preferred embodiment, the assemblage comprises first and second woven fabrics. In another embodiment, the assemblage comprises first and second knitted fabrics. In yet another embodiment, the assemblage comprises a woven fabric and a knitted fabric.

Preferably, the first woven or knitted fabric is formed of one or more first threadlike elements. Preferably, the second woven or knitted fabric is formed of one or more second threadlike elements.

In a preferred embodiment, the bearing structure comprises a plurality of identical bearing elements, that is to say the geometric characteristics and constituent materials of which are identical.

The bearing elements are arranged so that they are paired, not mechanically connected, in a space delimited by the first and second woven fabric(s) or knitted fabric(s). Thus, the bearing elements behave independently in mechanical terms. For example, the bearing elements are not connected together so as to form a network or a lattice.

"Threadlike element" is understood to mean any elongate element of great length relative to its cross section, whatever the shape, for example circular, oblong, rectangular or square, or even flat, of the latter, it being possible for this threadlike element to be, for example, twisted or wavy. When it is circular in shape, its diameter is preferably less than 5 mm, more preferentially within a range extending from 100 µm to 1.2 mm.

Advantageously, the first and second crosslinked adhesive compositions are substantially identical.

Preferably, each first and second threadlike element is textile, that is to say nonmetallic, and is, for example, made of a material chosen from a polyester, a polyamide, a polyketone, a polyvinyl alcohol, a cellulose, a mineral fibre, a natural fibre, an elastomeric material or a mixture of these materials. Mention may be made, among polyesters, for example, of PET (polyethylene terephthalate), PEN (polyethylene naphthalate), PBT (polybutylene terephthalate), PBN (polybutylene naphthalate), PPT (polypropylene terephthalate) or PPN (polypropylene naphthalate). Mention may be made, among polyamides, of aliphatic polyamides, such as polyamides 4-6, 6, 6-6 (nylon), 11 or 12, and aromatic polyamides, such as aramid.

For example, each first and second threadlike element is a textile assemblage comprising one or more monofilament or multifilament textile fibres, twisted or not twisted together. Thus, in one embodiment, it will be possible to have an assemblage in which the fibres are substantially parallel to one another. In another embodiment, it will be possible to also have an assemblage in which the fibres are helically wound. In yet another embodiment, each first and second threadlike element consists of a monofilament. Each monofilament or multifilament fibre exhibits a diameter of between 5 and 20 µm, for example 10 µm.

In another embodiment, each first and second threadlike element is metallic, for example an assemblage of metal monofilaments, each metal monofilament exhibiting a diameter typically of less than 50 µm, for example 10 µm. In one embodiment, each first and second threadlike element consists of an assemblage of several metal monofilaments. In another embodiment, each first and second threadlike element consists of a metal monofilament.

In a preferred embodiment, each bearing element is a threadlike bearing element.

"Threadlike element" is understood to mean any elongate element of great length relative to its cross section, whatever the shape, for example circular, oblong, rectangular or square, or even flat, of the latter, it being possible for this threadlike element to be, for example, twisted or wavy. When it is circular in shape, its diameter is preferably less than 5 mm, more preferentially within a range extending from 100 µm to 1.2 mm.

A threadlike bearing element, in particular the bearing portion, typically exhibits a characteristic smallest dimension E of its mean section $S_P$ (which is the mean of the sections obtained by cutting the threadlike bearing element by all the surfaces parallel to the first and second woven or knitted fabric(s) and comprised between the first and second woven or knitted fabric(s)) preferably at most equal to 0.02 times the maximum spacing between the two internal faces of the first and second woven or knitted fabric(s) (which corresponds to the mean radial height H of the interior annular space once the assemblage is arranged within the tire) and an aspect ratio K of its mean section $S_P$ preferably at most equal to 3. A characteristic smallest dimension E of the mean section $S_P$ of the bearing element at most equal to 0.02 times the mean radial height H of the interior annular space rules out any heavy bearing element having a large volume. In other words, when it is threadlike, each bearing element has high slenderness in the radial direction, allowing it to buckle on passing through the contact patch. Outside the contact patch, each bearing element returns to its initial geometry, since the buckling thereof is reversible. Such a bearing element has good fatigue strength. An aspect ratio K of its mean section $S_P$ at most equal to 3 means that the characteristic largest dimension L of its mean section $S_P$ is at most equal to 3 times the characteristic smallest dimension E of its mean section $S_P$.

A threadlike bearing element has a mechanical behaviour of threadlike type, that is to say that it can only be subjected to tensile or compressive exertions along its mean line.

It should be noted that not all the threadlike bearing elements of a bearing structure necessarily have identical lengths $L_P$.

Preferably, each threadlike bearing element is textile, that is to say nonmetallic, and is, for example, made of a material chosen from a polyester, a polyamide, a polyketone, a polyvinyl alcohol, a cellulose, a mineral fibre, a natural fibre, an elastomeric material or a mixture of these materials. Mention may be made, among polyesters, for example, of PET (polyethylene terephthalate), PEN (polyethylene naphthalate), PBT (polybutylene terephthalate), PBN (polybutylene naphthalate), PPT (polypropylene terephthalate) or PPN (polypropylene naphthalate). Mention may be made, among polyamides, of aliphatic polyamides, such as polyamides 4-6, 6, 6-6 (nylon), 11 or 12, and aromatic polyamides, such as aramid.

For example, each threadlike bearing element is a textile assemblage comprising one or more monofilament or multifilament textile fibres, twisted or not twisted together. Thus, in one embodiment, it will be possible to have an assemblage in which the fibres are substantially parallel to one another. In another embodiment, it will be possible to also have an assemblage in which the fibres are helically wound. In yet another embodiment, each threadlike bearing element consists of a monofilament. Each monofilament or multifilament fibre exhibits a diameter of between 5 and 20 μm, for example 10 μm.

In another embodiment, each threadlike bearing element is metallic, for example an assemblage of metal monofilaments, each metal monofilament exhibiting a diameter typically of less than 50 μm, for example 10 μm. In one embodiment, each threadlike bearing element consists of an assemblage of several metal monofilaments. In another embodiment, each threadlike bearing element consists of a metal monofilament.

In one embodiment, each threadlike bearing element extends alternately from the first woven or knitted fabric towards the second woven or knitted fabric and from the second woven or knitted fabric towards the first woven or knitted fabric, on moving along the threadlike bearing element.

More preferably still, each threadlike bearing element is interlaced with each first and second woven or knitted fabric. Such an assemblage exhibits the advantage of being able to be manufactured in a single weaving stage. However, it is also possible to envisage manufacturing the assemblage in two stages, a first stage of manufacture of the first and second woven or knitted fabric(s) and a second stage of interlacing of the threadlike bearing element or elements with the first and second woven or knitted fabric(s). In both cases, the interlacing of each bearing element with each first and second woven or knitted fabric makes it possible to ensure the mechanical anchoring of each bearing element in each first and second woven or knitted fabric and thus to confer the desired mechanical properties on the bearing structure.

Preferably, the threadlike bearing element comprises:
at least one threadlike bearing portion extending between the first and second woven or knitted fabric(s), and
at least first and second threadlike portions for anchoring the threadlike bearing element respectively in the first and second woven or knitted fabric(s), prolonging the threadlike bearing portion respectively into the first and second woven or knitted fabric(s).

Each threadlike bearing portion which connects the internal faces of the first and second woven or knitted fabric(s) to one another can be characterized geometrically by its length $L_P$ and by its mean section $S_P$, which is the mean of the sections obtained by cutting the threadlike bearing portion by all the surfaces parallel to the first and second woven or knitted fabric(s) and comprised between the first and second woven or knitted fabric(s). In the most frequent case of an unchanging section of the bearing element and the threadlike bearing portion, the mean section $S_P$ is equal to this unchanging section.

The mean section $S_P$ of each threadlike bearing portion comprises a characteristic largest dimension L and a characteristic smallest dimension E, the ratio K=L/E of which is known as the aspect ratio. By way of examples, a circular mean section $S_P$, having a diameter equal to d, has an aspect ratio K=1, a rectangular mean section $S_P$, having a length L and a width l, has an aspect ratio K=L/l, and an elliptical mean section $S_P$, having a major axis A and a minor axis a, has an aspect ratio K=A/a.

In a preferred embodiment, the first woven or knitted fabric is a woven fabric comprising intertwinings of a first family of the first threadlike elements, substantially parallel to one another, and of a second family of the first threadlike elements, substantially parallel to one another.

In a preferred embodiment, the second woven or knitted fabric is a woven fabric comprising intertwinings of a first family of the second threadlike elements, substantially parallel to one another, and of a second family of the second threadlike elements, substantially parallel to one another.

In this preferred embodiment, the woven fabric comprises, in a way known to a person skilled in the art, a weave characterizing the intertwining of the threadlike elements of the first and second families. According to the embodiments, this weave is of plain, twill or satin type. Preferably, in order to confer good mechanical properties in a tire use, the weave is of plain type.

In another embodiment, the first and/or the second woven or knitted fabric is a knitted fabric comprising interlaced loops.

Preferably, the first and second threadlike elements of the first family extending along a first direction and the first and second threadlike elements of the second family extending along a second direction, the first and second directions form, with one another, an angle ranging from 70° to 90°.

Thus, in a preferred embodiment in which the first woven or knitted fabric is a woven fabric comprising intertwinings of a first family of the first threadlike elements, substantially parallel to one another, and of a second family of the first threadlike elements, substantially parallel to one another, each first threadlike anchoring portion is wound, at least in part, around at least one of the first threadlike elements of at least one of the first and second families of the first threadlike elements of the first woven fabric.

In a preferred embodiment in which the second woven or knitted fabric is a woven fabric comprising intertwinings of a first family of the second threadlike elements, substantially parallel to one another, and of a second family of the second threadlike elements, substantially parallel to one another, each second threadlike anchoring portion is wound, at least in part, around at least one of the second threadlike elements of at least one of the first and second families of the second threadlike elements of the second woven fabric.

More preferably still, as each first family consists of first and second warp threadlike elements and the second family consists of first and second weft threadlike elements, each first and second threadlike anchoring portion is wound, at least in part, around first and second weft threadlike elements respectively of each first and second woven fabric. In another embodiment, each first and second threadlike anchoring portion is wound, at least in part, around first and second warp threadlike elements respectively of each first and second woven fabric.

The mechanical characteristics of such woven fabrics, such as their tensile stiffness and their tensile breaking force, according to the meaning of the threadlike elements of the first family or that of the threadlike elements of the second family, depend on the characteristics of the threadlike elements, such as, for textile threadlike elements, the count, expressed in tex or g/1000 m, the tenacity, expressed in cN/tex, and the standard contraction, expressed in %, these threadlike elements being distributed according to a given density, expressed in number of threads/dm. All these characteristics depend on the constituent material of the threadlike elements and on their process of manufacture.

Preferably, the first woven fabric extending along a main general direction, the first threadlike elements of at least one of the first and second families extend along a direction forming, with the main general direction of the first woven fabric, an angle at least equal to 10° and at most equal to 45°. More preferably still, the first family consisting of first warp threadlike elements and the second family consisting of first weft threadlike elements, the first warp threadlike elements form an angle at least equal to 10° and at most equal to 45° with the main direction of the first woven fabric. More preferably still, the first weft threadlike elements form an angle at least equal to 10° and at most equal to 45° with the main direction of the first woven fabric.

Preferably, the second woven fabric extending along a main general direction, the second threadlike elements of at least one of the first and second families extend along a direction forming, with the main general direction of the second woven fabric, an angle at least equal to 10° and at most equal to 45°. More preferably still, the first family consisting of second warp threadlike elements and the second family consisting of second weft threadlike elements, the warp threadlike elements form an angle at least equal to 10° and at most equal to 45° with the main direction of the second woven fabric. More preferably still, the second weft threadlike elements form an angle at least equal to 10° and at most equal to 45° with the main direction of the second woven fabric.

Main general direction is understood to mean the general direction along which the woven fabric extends according to its greatest length.

In one embodiment, each first threadlike element is coated directly with a layer of a first adhesion primer and the layer of the first adhesion primer is coated with the layer of the first adhesive composition.

In one embodiment each second threadlike element is coated directly with a layer of a second adhesion primer and the layer of the second adhesion primer is coated with the layer of the second adhesive composition.

Each first and second adhesion primer is, for example, an epoxy resin and/or an isocyanate compound, which is optionally blocked. Each first and second adhesive composition used can be a conventional RFL (resorcinol/formaldehyde latex) adhesive or alternatively the adhesives described in Applications WO 2013/017421, WO 2013/017422, WO 2013/017423, WO 2015007641 and WO 2015007642.

In another embodiment, each first and second threadlike element is coated directly with a layer respectively of each first and second adhesive composition.

Where this is in one or other of the embodiments described above, it can be advantageous to activate the surface of the first and second threadlike elements by the physical route, for example by using a treatment by radiation, such as a beam of electrons, or by plasma.

In one embodiment, each bearing element being a threadlike bearing element:
  each threadlike bearing element is coated with at least one layer of a third adhesive composition,
  then, each coated threadlike bearing element is heat treated, so as to crosslink the third adhesive composition,
  then, each coated and heat-treated threadlike bearing element is assembled with the first and second coated and heat-treated threadlike elements, so as to form the assemblage.

Assemblage According to the Invention

Another subject-matter of the invention is a tire assemblage, the assemblage comprising:
  a first woven or knitted fabric comprising one or more first threadlike elements, each first threadlike element being coated with at least one layer of a first crosslinked adhesive composition,
  a second woven or knitted fabric comprising one or more second threadlike elements, each second threadlike element being coated with at least one layer of a second crosslinked adhesive composition,
  a bearing structure comprising bearing elements connecting the first and second woven or knitted fabric(s) together,
  the assemblage being capable of being obtained by a process as described above.

The fact of carrying out the stages of individual coating and of individual heat treatment of each first and second threadlike element before the stage of formation of the assemblage makes it possible to avoid the formation of points of attachment at the intertwinings of the threadlike elements on each first and second woven or knitted fabric. Thus, on the one hand, each first and second woven or knitted fabric of the assemblage according to the invention is substantially devoid of points of attachment due respectively to the first and second adhesive compositions between respectively the first and second threadlike elements. On the other hand, the first and second reinforcing elements are individually better penetrated by respectively each first and second adhesive composition, in contrast to first and second reinforcing elements which would have been coated after the formation of each first and second woven fabric and the penetration of which by respectively each first and second adhesive composition at the intertwinings would have been detrimentally affected.

A further subject-matter of the invention is a tire assemblage, the assemblage comprising:
  a first woven or knitted fabric comprising one or more first threadlike elements, each first threadlike element being coated with at least one layer of a first crosslinked adhesive composition and being obtained after a stage of individual coating of each first threadlike element by the layer of the first adhesive composition, followed by a stage of individual heat treatment of each first coated threadlike element;

a second woven or knitted fabric comprising one or more second threadlike elements, each second threadlike element being coated with at least one layer of a second crosslinked adhesive composition and being obtained after a stage of individual coating of each second threadlike element by the layer of the second adhesive composition, followed by a stage of individual heat treatment of each second coated threadlike element;

a bearing structure comprising bearing elements connecting the first and second woven or knitted fabric(s) together.

Assembly According to the Invention

An additional subject-matter of the invention is a tire assembly, the assembly comprising:

first and second layers respectively of first and second polymeric compositions;

an assemblage as defined above, in which:
    the first woven or knitted fabric is impregnated, at least in part, with the first polymeric composition and forms a first impregnated woven or knitted structure of the assembly;
    the second woven or knitted fabric is impregnated, at least in part, with the second polymeric composition and forms a second impregnated woven or knitted structure of the assembly.

In one embodiment, each polymeric composition comprises at least one elastomer, preferably a diene elastomer. Elastomer or rubber (the two terms being synonyms) of the diene type is understood to mean, generally, an elastomer resulting, at least in part (i.e., a homopolymer or a copolymer), from diene monomers (monomers bearing two conjugated or unconjugated carbon-carbon double bonds). This composition can then be either in the raw state or in the cured state.

Particularly preferably, the diene elastomer of the rubber composition is selected from the group consisting of polybutadienes (BRs), synthetic polyisoprenes (IRs), natural rubber (NR), butadiene copolymers, isoprene copolymers and the mixtures of these elastomers. Such copolymers are more preferably selected from the group consisting of butadiene/stirene copolymers (SBRs), isoprene/butadiene copolymers (BIRs), isoprene/stirene copolymers (SIRs), isoprene/butadiene/stirene copolymers (SBIRs) and the mixtures of such copolymers.

Each polymeric composition can comprise just one diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Furthermore, in this embodiment, each polymeric composition comprises, in addition to the elastomer, preferably the diene elastomer, a reinforcing filler, for example carbon black, a crosslinking system, for example a vulcanization system, and various additives.

In another embodiment, each polymeric composition comprises at least one thermoplastic polymer. A thermoplastic polymer is, by definition, heat meltable. Examples of such thermoplastic polymers are aliphatic polyamides, for example nylon, polyesters, for example PET or PEN, and thermoplastic elastomers.

Thermoplastic elastomers (abbreviated to "TPEs") are elastomers provided in the form of block copolymers based on thermoplastic blocks. With a structure intermediate between thermoplastic polymers and elastomers, they are formed, in a known way, of rigid thermoplastic, in particular polystirene, sequences connected by flexible elastomer sequences, for example polybutadiene or polyisoprene sequences for unsaturated TPEs or poly(ethylene/butylene) sequences for saturated TPEs. This is the reason why, in a known way, the above TPE block copolymers are generally characterized by the presence of two glass transition peaks, the first peak (the lower, generally negative, temperature) relating to the elastomer sequence of the TPE copolymer and the second peak (the higher, positive, temperature, typically greater than 80° C. for preferred elastomers of the TPS type) relating to the thermoplastic (for example stirene blocks) part of the TPE copolymer. These TPE elastomers are often triblock elastomers with two rigid segments connected by a flexible segment. The rigid and flexible segments can be positioned linearly, in a star or branched configuration. These TPE elastomers can also be diblock elastomers with a single rigid segment connected to a flexible segment. Typically, each of these segments or blocks contains at least more than 5, generally more than 10, base units (for example, stirene units and isoprene units for a stirene/isoprene/stirene block copolymer).

Preferably, the thermoplastic elastomer is unsaturated. Unsaturated TPE elastomer is understood to mean, by definition and in a well-known way, a TPE elastomer which is provided with ethylenic unsaturations, that is to say which comprises (conjugated or unconjugated) carbon-carbon double bonds; conversely, a "saturated" TPE elastomer is, of course, a TPE elastomer which is devoid of such double bonds.

The first and second polymeric compositions can be different or identical. For example, the first polymeric composition can comprise a diene elastomer and the second polymeric composition can comprise a thermoplastic elastomer, or vice versa.

Tire According to the Invention

The invention also relates to a tire comprising an assemblage as defined above or an assembly as defined above.

In one embodiment, the tire comprises:

a first structure of revolution comprising the first woven or knitted fabric and a first layer of a first polymeric composition, the first woven or knitted fabric being impregnated, at least in part, with the first polymeric composition a second structure of revolution comprising the second woven or knitted fabric and a second layer of a first polymeric composition, the second woven or knitted fabric being impregnated, at least in part, with the second polymeric composition, the second structure of revolution being arranged radially inside the first structure of revolution;

a crown structure of revolution arranged radially outside the first structure of revolution;

an interior annular space delimited by an internal face of the first structure of revolution and an internal face of the second structure of revolution;

two sidewalls connecting together each axial end of the first, radially exterior, structure of revolution and each axial end of the second structure of revolution, the two sidewalls delimiting the interior annular space; the interior annular space forming a closed cavity which can be pressurized by an inflation gas.

The second impregnated woven or knitted structure forming the second, radially interior, structure of revolution of the tire is intended to provide, among other functions, for the bonding of the assemblage, and thus of the tire, with the fitting means. The first impregnated woven or knitted structure forming the first, radially exterior, structure of revolution of the tire is intended to provide, among other functions, for the bonding of the assemblage with the crown structure of revolution.

Preferably, since each sidewall has a curvilinear length $L_F$, the curvilinear length $L_F$ of each sidewall is advantageously at least equal to 1.05 times, preferably 1.15 times, the mean radial height H of the interior annular space. More advantageously still, the curvilinear length $L_F$ of each sidewall is at least equal to 1.3 times and at most equal to 1.6 times the mean radial height H of the interior annular space. This characteristic of sidewall length guarantees that the deformation of the sidewall will not impair the meridian flattening of the tire type device tire due to an excessively low curvature.

Advantageously, the sidewalls are not directly bonded to the assemblage and preferably are not directly bonded to the bearing elements. The sidewalls partly contribute to the bearing of the load, depending on their own structural stiffness. However, the sidewalls have an independent mechanical behaviour and do not interfere in the mechanical behaviour of the bearing structure. The sidewalls generally comprise at least one elastomeric material and can optionally comprise a reinforcement.

In the case of effective pressurization by an inflation gas, the tire then exhibits a pneumatic stiffness, due to the pressure, which will also contribute to the bearing of the applied load. Usually, for use on a passenger vehicle, the pressure is at least equal to 0.5 bar, preferably at least equal to 1 bar. The higher the pressure, the greater the contribution of the pneumatic stiffness to the bearing of the load applied and, correspondingly, the lower the contribution of the structural stiffness of the bearing structure and/or of the sidewalls and/or of the respectively radially exterior and radially interior structures of revolution to the bearing of the load applied. In the absence of pressurization and in the case of a low structural stiffness of the sidewalls, the bearing structure and the respectively radially exterior and radially interior structures of revolution would be compelled to provide virtually all of the bearing of the load, the sidewalls mainly having only a protective role with respect to possible attack by elements external to the tire.

The first impregnated woven or knitted structure forming the first, radially exterior, structure of revolution of the tire exhibits an axis of revolution coincident with the axis of rotation of the tire. The second impregnated woven or knitted structure forming the second, radially interior, structure of revolution of the tire is coaxial with the first impregnated woven or knitted structure forming the first, radially exterior, structure of revolution of the tire.

The interior annular space has a mean radial height H. When the tire is subjected to a nominal radial load $Z_N$ and is in contact with flat ground by a contact surface area A, the bearing elements, connected to the portion of the first impregnated woven or knitted structure forming the first, radially exterior, structure of revolution of the tire in contact with the ground via the first woven or knitted fabric, are subjected to buckling in compression and at least a part of the bearing elements, connected to the portion of the first impregnated woven or knitted structure forming the first, radially exterior, structure of revolution of the tire not in contact with the ground, are in tension.

In order to withstand the load applied, the mean surface density D of threadlike bearing portions per unit of surface area of the first impregnated woven or knitted structure forming the first, radially exterior, structure of revolution, expressed in $1/m^2$, being is at least equal to $(S/S_E)*Z/(A*Fr)$, where S is the surface area, in $m^2$, of the radially interior face of the crown structure of revolution, $S_E$ is the binding surface area between the external face of the first impregnated woven or knitted structure forming the first, radially exterior (which is the external face of the first band), structure of revolution and the radially interior face of the crown structure of revolution, in $m^2$, $Z_N$ is the nominal radial load, in N, applied to the tire, A is the ground contact surface area, in $m^2$, of the tire and Fr is the breaking force, in N, of each bearing portion. The nominal radial load $Z_N$ is the recommended load for use of the tire. The ground contact surface area A is the surface area over which the tire is squashed on the ground under the action of the nominal radial load $Z_N$.

The expression according to which D is at least equal to $(S/S_E)*Z/(A*Fr)$ reflects, in particular, the fact that the mean surface density D of the bearing portions increases as the nominal radial load $Z_N$ increases and/or as the ratio of $S_E/S$ surfaces, representing the degree of overlap of the radially interior face of the crown structure of revolution by the first impregnated woven or knitted structure forming the first, radially exterior, structure of revolution, decreases. The mean surface density D of the bearing portions decreases as the tensile breaking force Fr of a bearing portion increases.

Such a mean surface density D of the bearing portions makes it possible, on the one hand, for the bearing elements in tension outside the contact patch to bear the nominal radial load $Z_N$ and, on the other hand, for the bearing elements in compression in the contact patch to guarantee a flattening of the tread, both in a circumferential plane and in a meridian plane, which is improved in comparison with the known tires of the state of the art.

Generally, the surface density of the bearing portions is unvarying both in the circumferential direction and in the axial direction, that is to say that the distribution of the bearing portions is uniform both circumferentially and axially: the mean surface density D is thus equal to the unvarying surface density. The advantage of an unvarying surface density is that it helps to give the tread a virtually cylindrical geometry, with a reduced "rippling" effect, in comparison with other tires of the state of the art.

However, in some embodiments, the surface density of the bearing portions may be variable in the circumferential direction and/or in the axial direction, that is to say that the distribution of the bearing portions is not necessarily uniform circumferentially and/or axially, hence the introduction of the characteristic of mean surface density D of bearing portions.

The surface density D of the bearing portions, expressed in $1/m^2$, is advantageously at least equal to $3*(S/S_E)*Z/(A*Fr)$. A higher surface density of bearing portions improves the homogenization of the pressures in the ground contact patch and guarantees a higher safety coefficient with respect to the load applied and with respect to the endurance.

The surface density D of the bearing portions, expressed in $1/m^2$, is more advantageously still at least equal to $6*(S/S_E)*Z/(A*Fr)$. An even higher surface density of bearing portions improves even further the homogenization of the pressures in the ground contact patch and makes it possible to further increase the safety coefficient with respect to the load applied and with respect to the endurance.

The mean surface density D of the bearing portions, expressed in $1/m^2$, is advantageously at least equal to 5000.

In some embodiments, the surface area $S_E$ is substantially equal to the surface area S, that is to say that the first impregnated woven or knitted structure forming the first, radially exterior, structure of revolution first woven or knitted fabric completely overlaps the radially interior face of the crown structure of revolution. Under these conditions, the minimum mean surface density D of the bearing portions is equal to $Z/(A*Fr)$.

In other embodiments, $S_E$ is different from S and even $S_E<S$. This is because the first impregnated woven or knitted structure is not necessarily continuous (axially and/or circumferentially) and can consist of juxtaposed portions of woven or knitted fabric: in this case, the surface area $S_E$ is the sum of the binding surface areas between the external faces of the first impregnated woven or knitted structure forming the first, radially exterior, structure of revolution (which are the external faces of the first layer) and the radially interior face of the crown structure of revolution. Thus, when $S_E<S$, the first impregnated woven or knitted structure forming the first, radially exterior, structure of revolution does not completely overlap, that is to say only partially overlaps, the radially interior face of the crown structure of revolution.

This design advantageously makes it possible to have an assemblage which can be manufactured independently and integrated in a single block during the manufacture of the tire. The assemblage used can be rendered integral with other elements of the tire by vulcanization, adhesive bonding or any other process for bonding the first and second layers of the first and second polymeric compositions.

The first radially exterior woven or knitted fabric and the second radially interior woven or knitted fabric serve as interfaces between the bearing elements and the respectively radially exterior and radially interior structures of revolution, which are thus not in direct contact.

By virtue of the tire described, an improved flattening of the tread, in particular in a meridian plane, by an increase in the meridian radii of curvature at the axial ends of the tread, is observed.

This results, in particular, in a homogenization of the pressures in the ground contact patch, which contributes to increasing the lifetime in terms of wear and the grip of the tire.

An increase in the natural vibrational frequencies of the tire, which contributes to improving the vibrational and acoustic comfort of the tire, is also observed.

Finally, the rolling resistance of such a tire is substantially decreased, which is favourable to a fall in the fuel consumption of the vehicle.

Process for the Manufacture of a Tire According to the Invention

A further subject-matter of the invention is a process for the manufacture of a tire, in which:
- an assemblage or an assembly as defined above is wound around a confection cylinder substantially of revolution around an axis of revolution;
- at least one of the first and second woven or knitted fabrics is separated radially with respect to the axis of revolution.

In one embodiment, the tire comprising:
- a first structure of revolution comprising the first woven or knitted fabric and a first layer of a first polymeric composition, the first woven or knitted fabric being impregnated, at least in part, with the first polymeric composition;
- a second structure of revolution comprising the second woven or knitted fabric and a second layer of a first polymeric composition, the second woven or knitted fabric being impregnated, at least in part, with the second polymeric composition, the second structure of revolution being arranged radially inside the first structure of revolution;
- an interior annular space delimited by an internal face of the first structure of revolution and an internal face of the second structure of revolution;
- two sidewalls connecting together each axial end of the first structure of revolution and each axial end of the second structure of revolution, the two sidewalls delimiting the interior annular space; the interior annular space forming a closed cavity which can be pressurized by an inflation gas;

in which process:
- the interior annular space is formed;
- the interior annular space is opened out.

Preferably, in order to form the interior annular space, each sidewall is joined to each axial end of the first and second structures of revolution, so as to form the interior annular space.

Advantageously, the interior annular space is opened out by pressurization by an inflation gas of the interior annular space.

Preferably, after the interior annular space has been opened out, a crown structure of revolution is wound radially on the outside of the first structure of revolution.

BRIEF DESCRIPTION OF THE DRAWINGS

The invention will be better understood on reading the description which will follow, given solely as nonlimiting example and made with reference to the drawings, in which.

DETAILED DESCRIPTION OF EMBODIMENTS OF THE INVENTION

Examples of Tires According to the Invention

A frame of reference X, Y, Z corresponding to the usual respectively axial (along the YY' direction), radial (along the ZZ' direction) and circumferential (along the XX' direction) orientations of a tire has been represented in the figures.

Figure 1:
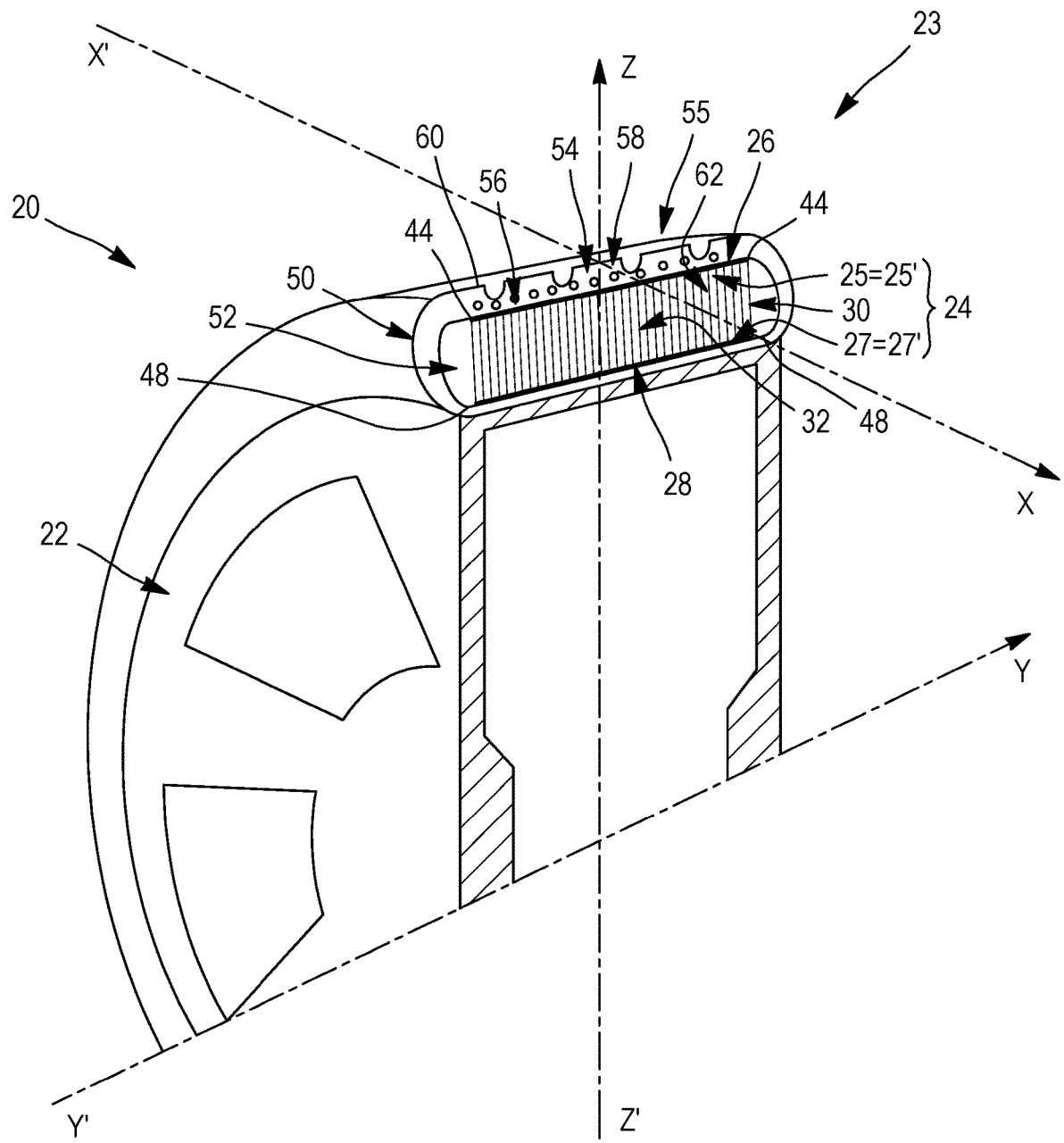
FIG. 1 is a view in perspective and in partial section of a tire according to a first embodiment of the invention.

A tire in accordance with a first embodiment of the invention and denoted by the general reference 20 has been represented in FIG. 1. The tire 20 is substantially of revolution around an axis substantially parallel to the axial direction YY'. The tire 20 is in this instance intended for a passenger vehicle. In FIG. 1, the tire 20 is fitted to a fitting means 22, in this instance a wheel rim, thus forming a fitted assembly 23 for a vehicle.

The tire 20 comprises an assemblage 24 comprising a first impregnated woven or knitted structure 25 and a second impregnated woven or knitted structure 27. The second impregnated woven or knitted structure 27 is arranged radially on the inside, with respect to the first impregnated woven structure 25. In the case in point, each first and second structure 25, 27 is an impregnated woven structure. In an alternative form, each first and second structure 25, 27 is an impregnated knitted structure.

Figure 5:
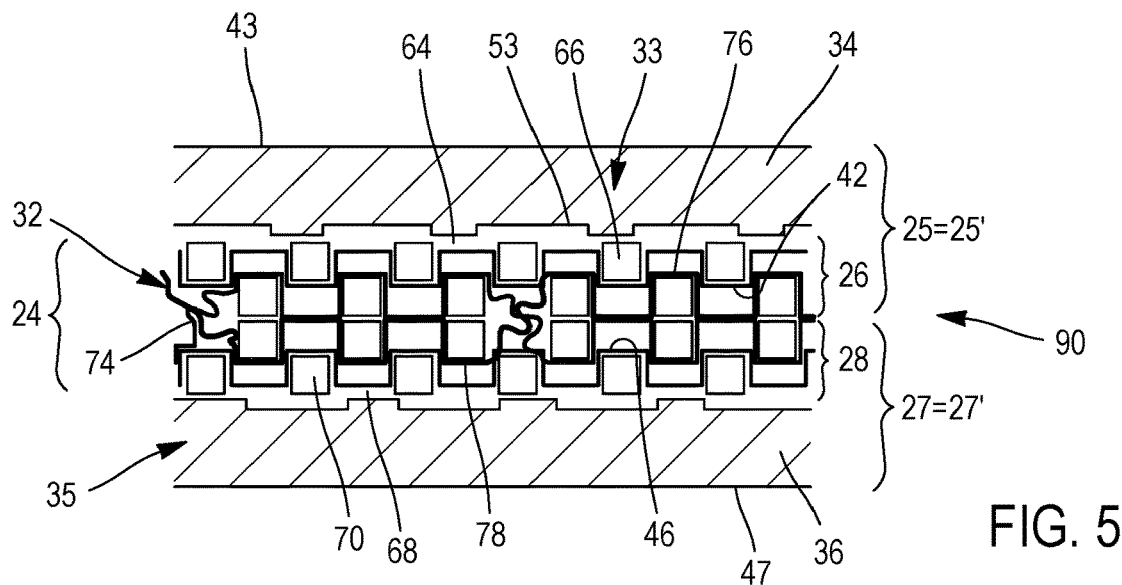
FIG. 5 is a view in section of an assembly according to the invention comprising the assemblage according to the invention of FIG. 4 along a sectional plane P-P.

As illustrated in FIG. 5, the first impregnated woven structure 25 comprises a first woven or knitted fabric 26, in this instance a woven fabric 26, and a first layer 33 of a first polymeric composition 34, the first woven fabric 26 being impregnated, at least in part, with the first polymeric composition 34. The second impregnated woven structure 27 comprises a second woven or knitted fabric 28, in this instance a woven fabric 28, and a second layer 35 of a second polymeric composition 36, the second woven fabric 28 being impregnated, at least in part, with the second polymeric composition 36. In an alternative form, each first and second structure 25, 27 comprises a knitted fabric impregnated, at least in part, respectively with each polymeric composition 34, 36.

In the tire 20, the first woven fabric 26 is arranged radially on the outside, with respect to the second woven fabric 28. Each first and second polymeric composition 34, 36 comprises, for example, an elastomeric composition comprising at least one elastomer, preferably a diene elastomer, for example natural rubber.

Within the tire 20, the first impregnated woven structure 25 forms a first structure of revolution 25' and the second impregnated woven structure 27 forms a second structure of revolution 27' arranged radially on the inside of the first structure of revolution 25'.

The assemblage 24 also comprises a bearing structure 30 comprising bearing elements 32 connecting the first and second woven fabrics 26, 28 together. The bearing structure 30 is in this instance formed of a plurality of bearing elements 32.

Furthermore, the tire 20 comprises a crown structure of revolution 55 arranged radially on the outside of the first impregnated woven structure 25 forming the first, radially exterior, structure of revolution 25'. The crown structure of revolution 55 comprises a circumferential reinforcement 54 and a tread 58, as illustrated in FIGS. 1 and 5. The crown structure of revolution 55 comprises a radially interior face 59 and a radially exterior face 60 formed by the exterior face of the tread 58.

The circumferential reinforcement 54 comprises a polymeric composition, for example an elastomeric composition comprising at least one elastomer, preferably a diene elastomer, for example natural rubber, in which several metal or textile reinforcing elements 56, known to a person skilled in the art, are embedded.

The circumferential reinforcement 54 is arranged radially on the outside of the first impregnated woven structure 25 forming the first, radially exterior, structure of revolution 25' of the tire 20. The tread 58 is intended to come into contact with the ground. The tread 58 is formed of a polymeric composition, for example an elastomeric composition comprising at least one elastomer, preferably a diene elastomer, for example natural rubber. The tread 58 is arranged radially on the outside of the circumferential reinforcement 54.

As illustrated in FIGS. 1 and 5, the first impregnated woven structure 25 forming the first, radially exterior, structure of revolution 25' of the tire 20, the second impregnated woven structure 27 forming the second, radially interior, structure of revolution 27' of the tire 20 and the crown structure of revolution 55 exhibit a common axis of revolution, in the case in point the axis of rotation YY' of the tire 20.

The first impregnated woven structure 25 forming the first, radially exterior, structure of revolution 25' of the tire 20 exhibits an internal face 42 and an external face 43 and also two axial ends 44. The internal face 42 is an internal face of the first woven fabric 26 and the external face 43 is an external face of the first layer 33. Within the tire 20, the internal face 42 is arranged radially on the inside of the external face 43 and the external face 43 is in contact with a radially interior face of the crown structure of revolution 55.

The second impregnated woven structure 27 forming the second, radially interior, structure of revolution 27' of the tire 20 exhibits an internal face 46 and an external face 47 and also two axial ends 48. The internal face 46 is an internal face of the second woven fabric 28 and the external face 47 is an external face of the second layer 35. Within the tire 20, the internal face 46 is arranged radially on the outside of the external face 47.

The two faces 42 and 46 face one another and are substantially parallel to one another. Within the tire 20, each surface 42, 46 describes a cylinder of revolution around the axis YY' of the tire 20.

With reference to FIG. 1, the tire 20 also comprises two sidewalls 50. Each sidewall 50 connects together each axial end 44 of the first impregnated woven structure 25 forming the first, radially exterior, structure of revolution 25' of the tire 20 and each axial end 48 of the second impregnated woven structure 27 forming the second, radially interior, structure of revolution 27' of the tire 20.

The tire 20 also comprises an interior annular space 52 delimited, on the one hand, by each internal face 42 and 46 and, on the other hand, by the two sidewalls 50. The interior annular space 52 forms a closed cavity which can be pressurized by an inflation gas, for example air. The bearing elements 32 are in pairs independent in the interior annular space 52.

Figure 7:
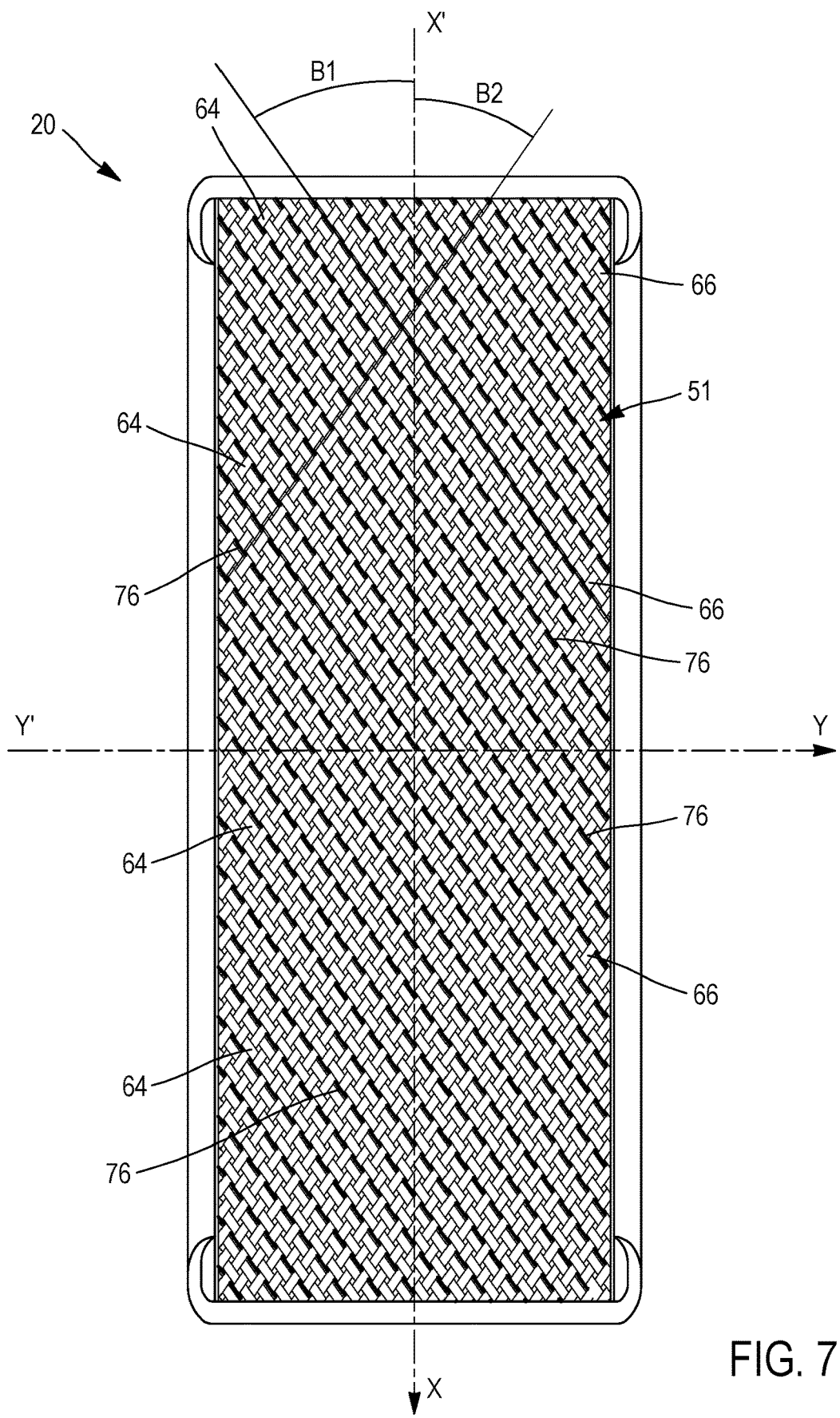
FIG. 7 is a view in partial meridian section of the tire of FIG. 1 which makes it possible to see a part of the assemblage of FIGS. 4 and 5 after manufacture of the tire.

In this first embodiment, the assemblage 24 extends axially in continuous fashion between the two sidewalls 50 of the tire 20. The assemblage 24 extends circumferentially over one turn around the axis of revolution YY' of the tire 20 so as to form an axially continuous assemblage band 51, as illustrated in FIG. 7.

Figure 2:
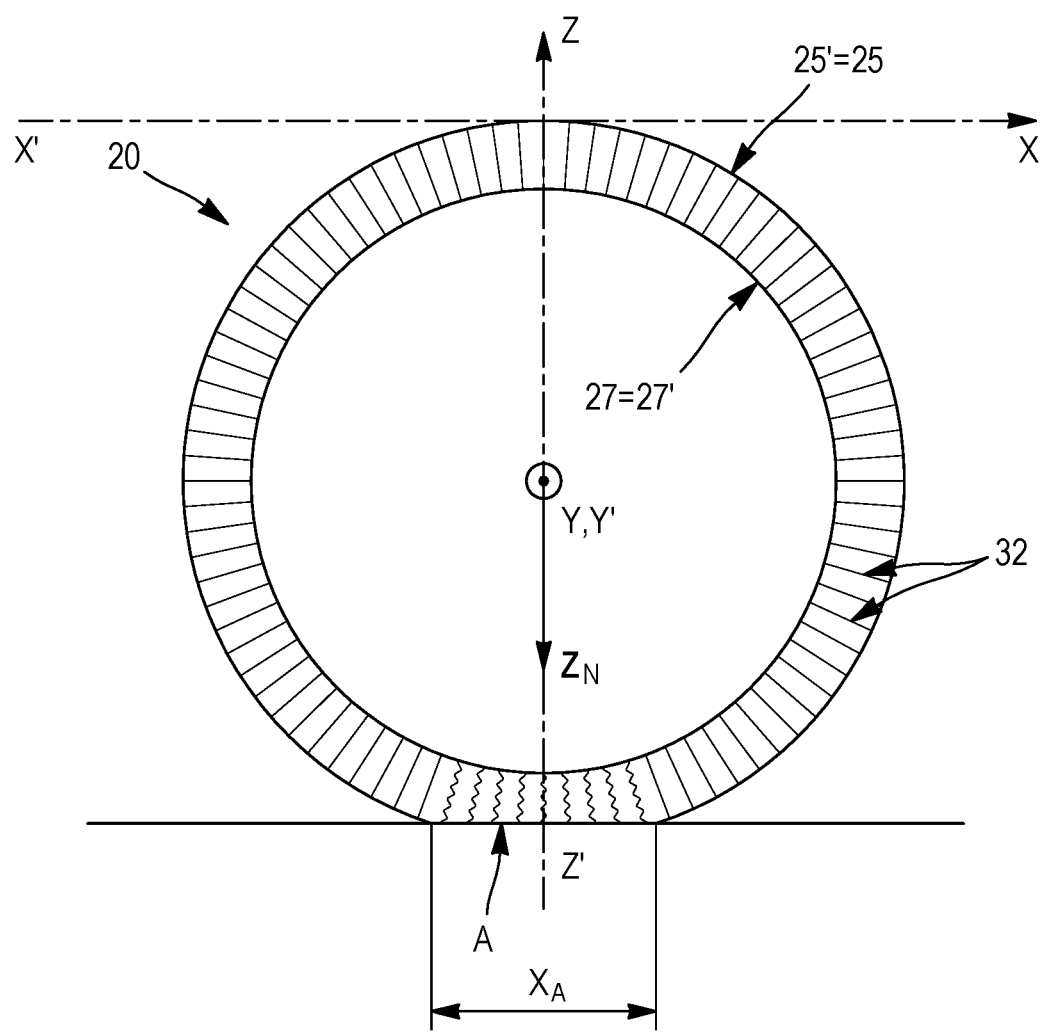
FIG. 2 is a view in circumferential section of the tire of FIG. 1, in the squashed state.
Figure 3:
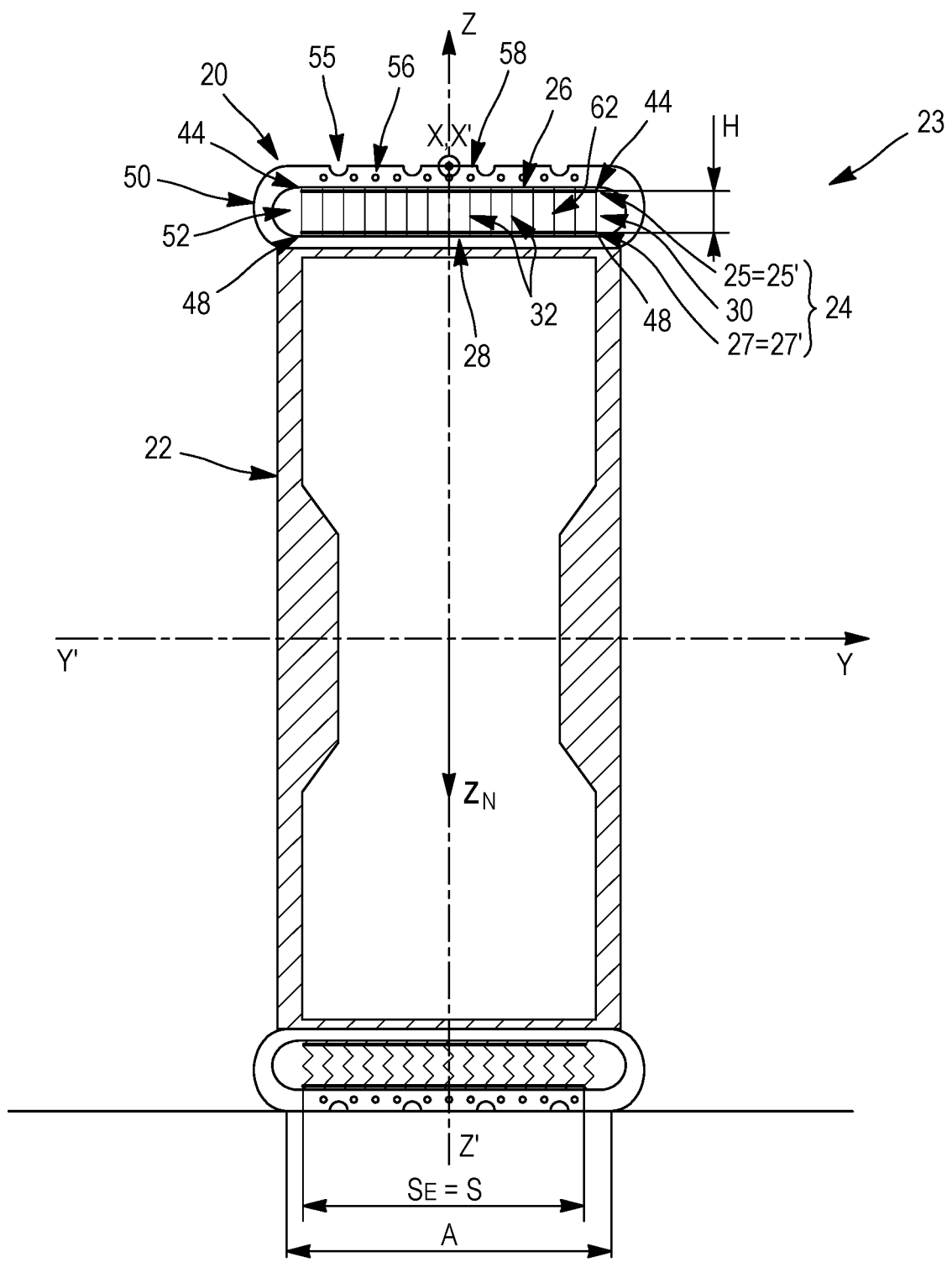
FIG. 3 is a view in meridian section of the tire of FIG. 1.

In FIGS. 2 and 3, the tire 20 is represented subjected to a nominal radial load $Z_N$. The tire 20 is in contact with flat ground by a contact surface area A, having a circumferential length $X_A$. The bearing elements 32, connected to the portion of the first impregnated woven structure 25 forming the first, radially exterior, structure of revolution 25' of the tire 20 in contact with the ground via the tread, are subjected to buckling in compression, while at least a part of the bearing elements 32, connected to the portion of the first impregnated woven structure 25 forming the first, radially exterior, structure of revolution 25' of the tire 20 not in contact with the ground, are in tension.

Figure 4:
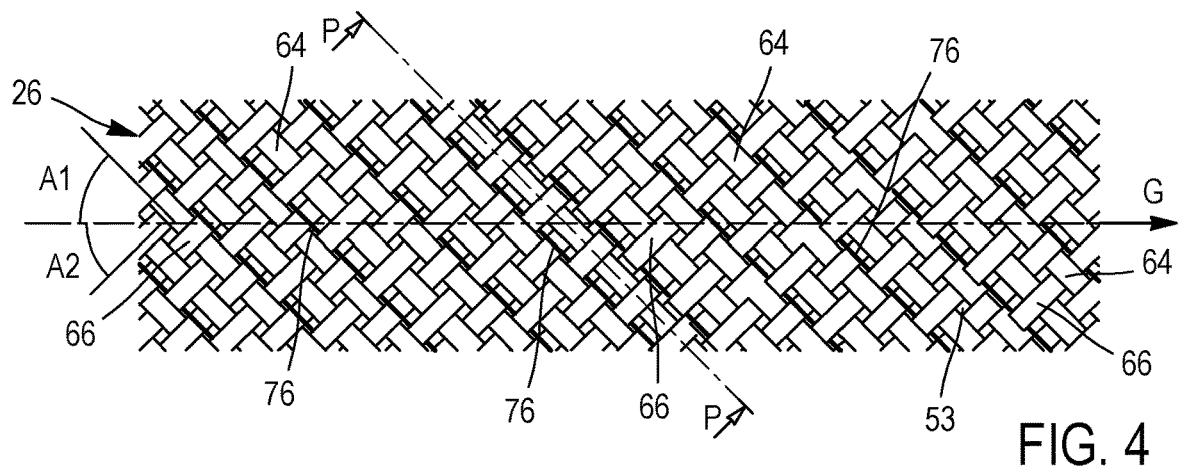
FIG. 4 is a top view of one of the woven fabrics of an assemblage according to the invention.

An external face 53 of the first woven fabric 26, before it is placed in the tire 20, has been represented in FIG. 4. The representation of the first layer 33 of polymeric composition 34 has been deliberately omitted for reasons of clarity of the account. An assemblage and an assembly 90 according to the invention have been represented in FIG. 5.

The first woven fabric 26 is a woven fabric comprising intertwinings of a first family of first threadlike elements 64, known as first warp threadlike elements, and of a second family of first threadlike elements 66, known as first weft threadlike elements. The first warp threadlike elements 64 of the first woven fabric 26 are substantially parallel to one another and extend along a "warp" direction. The first weft threadlike elements 66 of the first woven fabric 26 are substantially parallel to one another and extend along a "weft" direction. The first threadlike elements 64, 66 are coated with at least one layer of a first crosslinked adhesive composition and are obtained after a stage of individual coating of each first threadlike element 64, 66 by the layer of the first adhesive composition, followed by a stage of individual heat treatment of each first coated threadlike element 64, 66. In the case in point, each first threadlike element 64, 66 is coated with a layer of a first adhesion primer, in this instance a primer based on an epoxy resin and on blocked isocyanate, this layer of adhesion primer being itself coated with the layer of the first adhesive composition, in this instance an adhesive of RFL type.

The second woven fabric 28 is a woven fabric comprising intertwinings of a first family of second threadlike elements 68, known as second warp threadlike elements, and of a second family of second threadlike elements 70, known as second weft threadlike elements. The second warp threadlike elements 68 of the second woven fabric 28 are substantially parallel to one another and extend along a "warp" direction. The second weft threadlike elements 70 of the second woven fabric 28 are substantially parallel to one another and extend along a "weft" direction. The second threadlike elements 68, 70 are coated with at least one layer of a second crosslinked adhesive composition and are obtained after a stage of individual coating of each second threadlike element 68, 70 by the layer of the second adhesive composition, followed by a stage of individual heat treatment of each second coated threadlike element 68, 70. In the case in point, each second threadlike element 68, 70 is coated with a layer of a second adhesion primer, in this instance a primer based on an epoxy resin and on blocked isocyanate, this layer of adhesion primer being itself coated with the layer of the second adhesive composition, in this instance an adhesive of RFL type.

In the case in point, the first and second adhesion primers are identical. The first and second adhesive compositions are identical.

Within each first and second woven fabric 26, 28, the warp and weft directions form, with one another, an angle ranging from 70° to 90°. In the case in point, the angle is substantially equal to 90°.

The first and second threadlike elements 64, 66, 68, 70 are all substantially identical. Each first and second threadlike element 64, 66, 68, 70 is a textile threadlike element, in this instance made of polyethylene terephthalate (PET). In the case in point, each first and second threadlike element 64, 66, 68, 70 is a spun threadlike element exhibiting a linear density equal to 170 tex and a tenacity equal to 66 cN/tex.

The bearing elements 32 are threadlike bearing elements. Each threadlike bearing element 32 extends alternately from the first woven fabric 26 towards the second woven fabric 28 and from the second woven fabric 28 towards the first woven fabric 26, on moving along the threadlike bearing element 32. In addition, each threadlike bearing element 32 is interlaced with the first woven fabric 26 and the second woven fabric 28. Each threadlike bearing element 32 is a textile threadlike bearing element, in this instance made of polyethylene terephthalate (PET). In the case in point, each bearing element is a spun threadlike element exhibiting a linear density equal to 55 tex and a tenacity equal to 54 cN/tex. In the embodiment described, the threadlike bearing elements 32 are devoid of any layer of adhesive composition.

Each threadlike bearing element 32 comprises a threadlike bearing portion 74 extending between the first and second woven fabrics 26, 28, in particular between the internal faces 42 and 46. Each threadlike bearing element 32 comprises first and second threadlike portions 76, 78 for anchoring the threadlike bearing element 32 respectively in the first woven fabric 26 and the second woven fabric 28. Each first and second threadlike anchoring portion 76, 78 prolongs a bearing portion 74 respectively into each first woven fabric 26 and second woven fabric 28. Each first and second threadlike anchoring portion 76, 78 is wound, at least in part, around several threadlike elements of the first families of warp threadlike elements 64, 68 respectively of each first woven fabric 26 and each second woven fabric 28. Thus, each threadlike anchoring portion 76, 78 connects two threadlike bearing portions 74 together.

The threadlike anchoring portions 76 of the threadlike bearing elements 32 are seen in FIGS. 4 and 7.

In FIG. 4, the first woven fabric 26 and the second woven fabric 28 both extend along a main general direction G substantially parallel to the longitudinal edges of the first and second woven fabrics 26, 28. The first warp threadlike elements 64 of the first, radially exterior, woven fabric 26 extend along a direction forming, with the main general direction of the first woven fabric 26, an angle A1 at least equal to 10° and at most equal to 45°. The first weft threadlike elements 66 of the first, radially exterior, woven fabric 26 extend along a direction forming, with the main general direction of the first woven fabric 26, an angle A2 at least equal to 10° and at most equal to 45°.

Analogously, the second warp threadlike elements 68 of the second, radially interior, woven fabric 28 extend along a direction forming, with the main general direction of the second, radially interior, woven fabric 28, an angle A3 at least equal to 10° and at most equal to 45°. The second weft threadlike elements 70 of the second, radially interior, woven fabric 28 extend along a direction forming, with the main general direction of the first woven fabric 26, an angle A4 at least equal to 10° and at most equal to 45°. In the case in point, A1=A2=A3=A4=45°.

Figure 6:
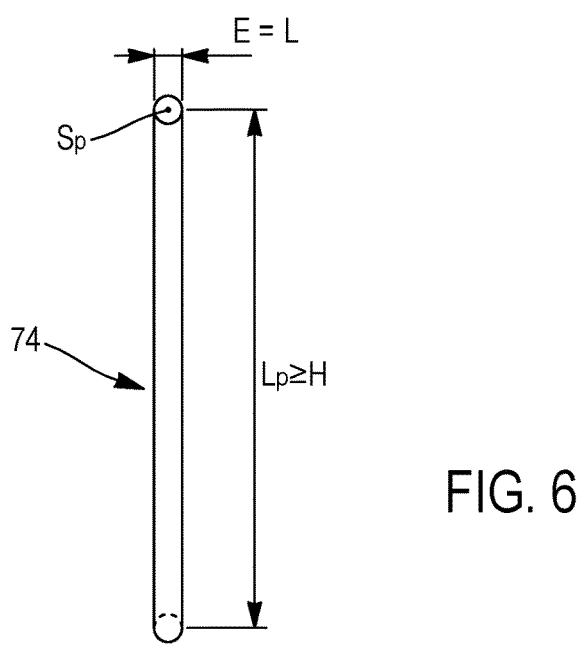
FIG. 6 is a view of a bearing element of a bearing structure of the tire of FIG. 1.

A threadlike bearing portion 74 of a threadlike bearing element 32 has been represented in FIG. 6. The threadlike bearing portion 74 exhibits a circular mean section $S_P$, defined by a characteristic smallest dimension E and a characteristic largest dimension L which are both equal, in the example presented, to the diameter of the circle, and characterized by its aspect ratio K equal to L/E, and thus equal to 1 in the present case. In addition, the characteristic smallest dimension E of the mean section $S_P$ of the threadlike bearing portion 74, that is to say, in the present case, its diameter, is at most equal to 0.02 times the mean radial height H of the interior annular space 52. The bearing portion 74 has a length $L_P$ at least equal to the mean height H of the interior annular space 52. The threadlike anchoring portions 76, 78 exhibit the same circular mean section $S_P$ and the same characteristic smallest dimension E of the mean section $S_P$.

The tire 20 has been represented partially in FIG. 7 so as to see the external face 53 of the first woven fabric 26 when the latter is arranged within the tire 20.

The first warp threadlike elements 64 of the first woven fabric 26 extend along a direction forming, with the circumferential direction XX' of the tire 20, an angle B1 which is less than the angle A1. Likewise, the first weft threadlike elements 66 of the first woven fabric 26 extend along a direction forming, with the circumferential direction XX' of the tire 20, an angle B2 which is less than the angle A2.

The second warp threadlike elements 68 of the second, radially interior, woven fabric 28 extend along a direction forming, with the circumferential direction XX' of the tire 20, an angle B3. Likewise, the second weft threadlike elements 70 of the second, radially interior, woven fabric 28 extend along a direction forming, with the circumferential direction XX' of the tire 20, an angle B4.

In the case in point, each angle B1, B2 is respectively less than each angle A1, A2 and is at least equal to 10° and less than 45° and in this instance B1=B2=38°. Each angle B3, B4 is respectively substantially equal to each angle A3, A4 and is at least equal to 10° and less than or equal to 45° and in this instance B3=B4=45°.

Figure 8:
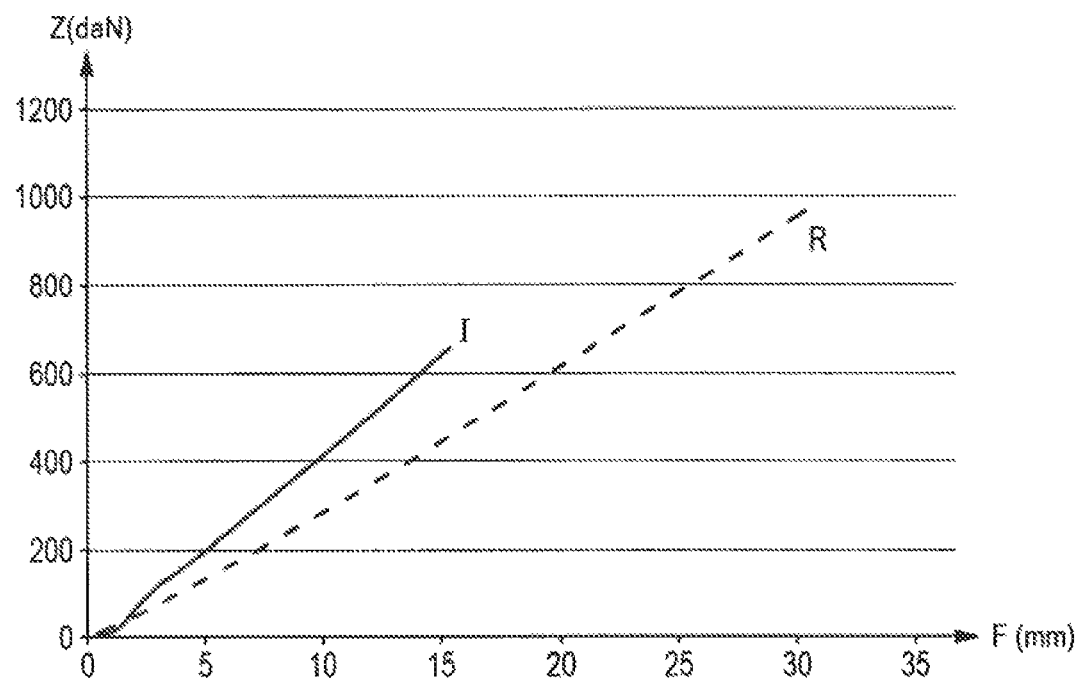
FIG. 8 illustrates comparative standard curves of the change in the load applied as a function of the deflection for the tire of FIG. 1 and a reference tire of the state of the art.
Figure 9:
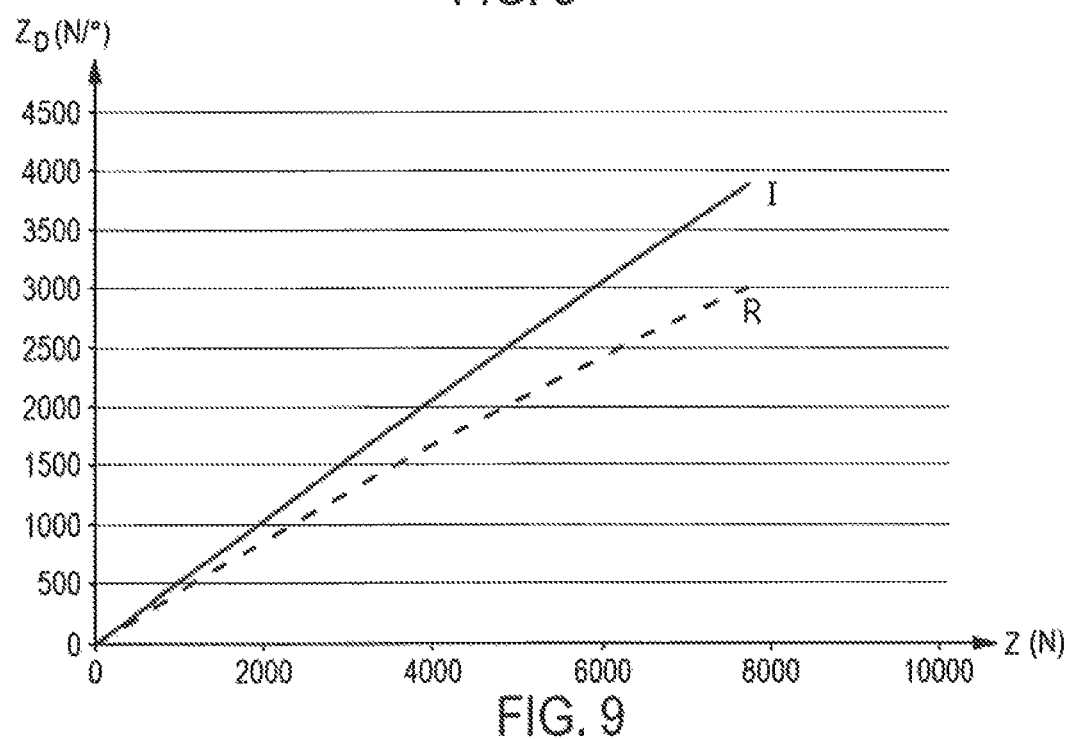
FIG. 9 illustrates comparative standard curves of the change in the cornering stiffness as a function of the load applied for the tire of FIG. 1 and a reference tire of the state of the art.

The tire 20, the stiffness characteristics of which are presented in FIGS. 8 and 9, comprises first and second radially exterior and radially interior structures of revolution 25', 27' having respective mean radii equal to 333 mm and 298 mm, and axial widths both equal to 250 mm. The interior annular space 52 has a mean radial height H equal to 35 mm. The tire 20 is inflated to a pressure P of between 1.5 bar and 2.5 bar and is subjected to a radial load $Z_N$ equal to 600 daN.

FIG. 8 presents two comparative standard curves of the change in the load applied Z, expressed in daN, as a function of deflection F, expressed in mm, for a tire according to the invention I and a reference tire R of the state of the art. FIG. 8 shows that, for a given radial load Z, the deflection F of a tire according to the invention I is smaller than that of the reference tire R. In other words, the radial stiffness of the tire according to the invention I is greater than the radial stiffness of the reference tire R.

FIG. 9 presents two comparative standard curves of the change in the cornering stiffness $Z_D$, expressed in N/°, as a function of the load applied, expressed in N, for a tire according to the invention I and a reference tire R of the state of the art. FIG. 9 shows that, for a given radial load Z, the cornering stiffness $Z_D$ of a tire according to the invention I is greater than that of the reference tire R.

A manufacturing process according to the invention will now be described with reference to FIGS. 10A, 10B and 10C.

In a stage prior to the formation of the assemblage 24, each first and second threadlike element 64, 66, 68, 70 is coated with the layers of adhesion primer and of adhesive composition. To do this, the first and second threadlike elements 64, 66, 68, 70 are first of all directly coated with the layer of adhesion primer in a first aqueous bath (approximately 94% of water) based on epoxy resin (polyglycerol polyglycidyl ether, approximately 1%) and on isocyanate compound (blocked caprolactam, approximately 5%). The layer of adhesion primer is then coated with the layer of adhesive composition, in this instance an RFL adhesive (approximately 81% by weight of water) based on resorcinol (approximately 2%), formaldehyde (approximately 1%) and a rubber latex (approximately 16% of NR, SBR and VP-SBR rubbers). The layers of primer and of adhesive composition are then dried, for example in a drying oven at 140° C. for 30 s. The first and second coated threadlike elements 64, 66, 68, 70 are then heat treated, so as to crosslink the layers of primer and of adhesive composition, by passing the first and second coated threadlike elements 64, 66, 68, 70 through a treatment oven at 240° C. for 30 s.

Then, in a stage of formation of the assemblage 24, the first threadlike elements 64, 66 are assembled, so as to form the first woven fabric 26, and the second threadlike elements 68, 70 are assembled, so as to form the second woven fabric 28. The bearing elements 32 are also assembled with the first and second woven fabrics 26, 28. In the embodiment described as example, the first and second coated and heat-treated threadlike elements 64, 66, 68, 70 are assembled, in a single stage and thus simultaneously, with the bearing elements 32, so as to form the assemblage 24. In another embodiment, each first and second woven fabric 26, 28 is first of all formed separately and then the first and second woven fabrics 26, 28 are connected together with the bearing elements 32. The stage of formation of the assemblage 24 according to the invention is carried out in a way known by a person skilled in the art of woven fabrics.

Then, in a stage of impregnation of the first and second woven fabrics 26, 28, each first and second woven fabric 26, 28 is respectively impregnated with the first and second polymeric compositions 34, 36, so as to form the first and second bands 33, 35 and to constitute the first and second impregnated woven structures 25, 27.

Figure 10A:
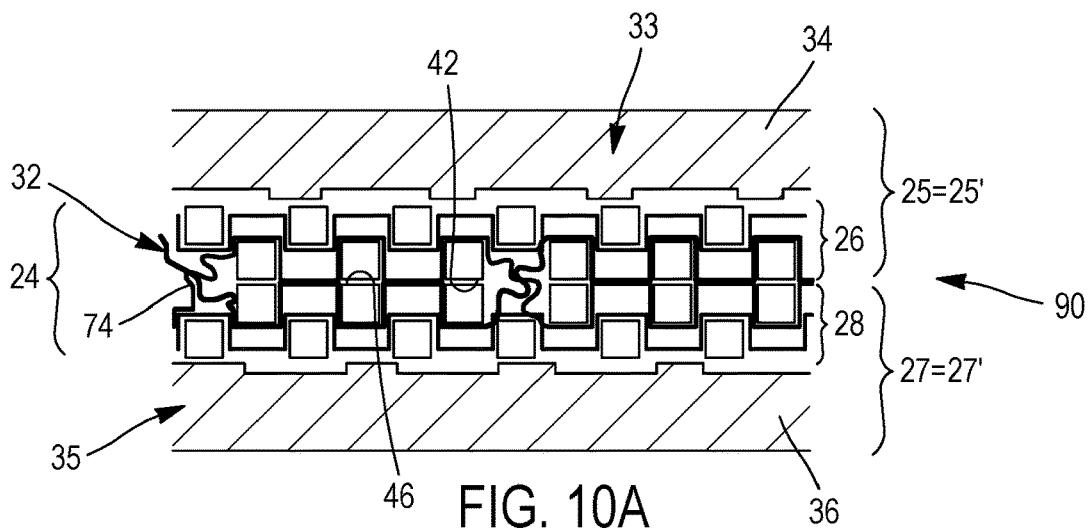
FIGS. 10A to 10C illustrate the opening out of the assemblage and of the assembly according to the invention during the process for the manufacture of the tire according to the invention.
Figure 10B:
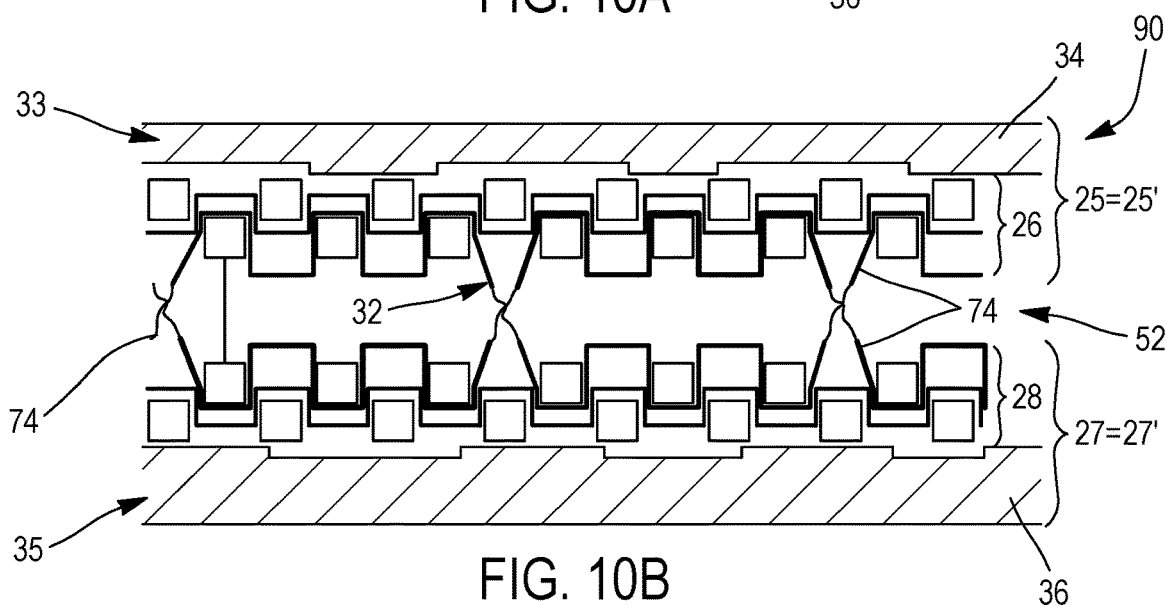
Figure 10C:
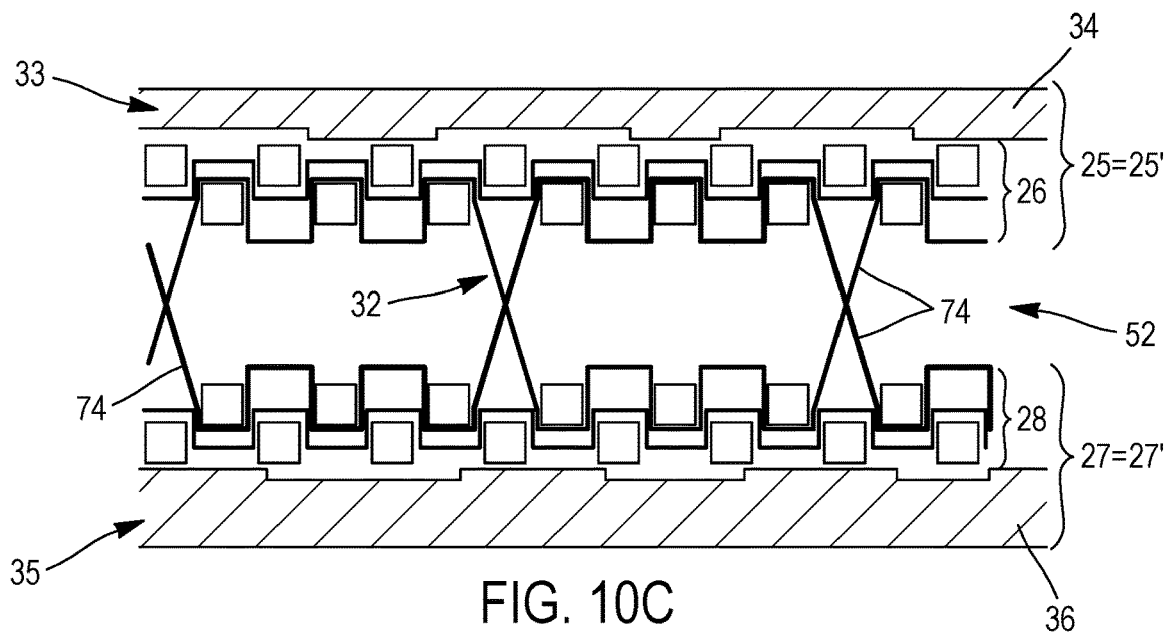

The assembly 90 according to the invention represented in FIG. 10A is then obtained. The surface breaking force Fs of the threadlike bearing portions 74, and by extension of the bearing elements 32, is defined by Fs=Fr.D, in which Fr is the breaking force, in N, of each threadlike bearing portion 74 and D is the mean surface density of the threadlike bearing portions 74 per unit of surface area of first impregnated woven structure 25, expressed in 1/m².

In the example of the first embodiment, the threadlike bearing elements 32 are individually identical. Each bearing element 32 is made of polyethylene terephthalate (PET) and exhibits a mean section $S_P$ equal to $7*10^{-8}$ m² and a breaking stress $F_r/S_P$ equal to 470 MPa. The mean surface density D of the threadlike bearing portions 74 per unit of surface area of the first impregnated woven structure 25 and per unit of surface area of the second impregnated woven structure 27 is equal to 85 000 yarns/m². The breaking force Fr is equal to 33 N.

A confection cylinder is available, the diameter of which is equal to that of the fitting means on which the tire 20 is intended to be fitted. The confection cylinder is substantially of revolution around an axis of revolution coaxial with the axis of revolution YY' of the tire 20. The assembly 90 of FIG. 10A is wound around this confection cylinder. The assembly 90 according to the invention then forms an axially continuous cylindrical winding around the axis of revolution YY' of the tire 20, the axial width of which is greater than or equal to 50%, preferably greater than or equal to 75%, of the axial width of the tread 58. In this case, the assembly 90 is deposited according to a single cylindrical winding turn. The expression full-width laying is used, since the targeted axial width of the assembly 90 is obtained in a single cylindrical winding turn. The advantage of full-width laying is the manufacturing productivity. On the other hand, full-width laying necessarily implies the existence of at least one overlapping region, or welding region, along the circumferential direction, between the circumferential ends of the assembly 90, in particular at the end of winding. The assembly 90 is laid so that the warp threadlike elements 64, 68 and the weft threadlike elements 66, 70, which are substantially perpendicular to one another, form, with the circumferential direction XX' of the tire 20, angles A1, A2, A3, A4 substantially equal to 45°.

The interior annular space 52 is then formed. To do this, in the embodiment described, each sidewall 50 is joined to each axial end 44, 48 of the first impregnated woven structure 25 and of the second impregnated woven structure 27, so as to form the interior annular space 52.

At least one of the first and second impregnated woven structures 25, 27, in the case in point solely the first impregnated woven structure 25, is then separated radially, with respect to the axis of revolution of the tire 20. To do this, in the embodiment described, the interior annular space 52 is opened out by pressurization with an inflation gas of the interior annular space 52, for example air. The assembly 90 according to the invention represented in FIG. 10B is then obtained. Each threadlike bearing portion 74 is still in a folded or flexed state.

Subsequently, on continuing to radially separate at least one of the first and second impregnated woven structures 25, 27, in the case in point solely the first impregnated woven structure 25, with respect to the axis of revolution YY' of the tire 20, the interior annular space 52 is opened out by pressurization with the inflation gas. The assembly represented in FIG. 10C is then obtained, in which assembly each threadlike bearing portion 74 is in a substantially tensed state.

During the radial separation of at least one of the first and second impregnated woven structures 25, 27 with respect to the axis of revolution YY' of the tire 20, generally known as conformation, the diameter of the first impregnated woven structure 25 forming the first radially exterior structure of revolution 25' of the tire 20, and thus of the first woven fabric 26, increases, whereas the diameter of the second impregnated woven structure 27 forming the second radially interior structure of revolution 27' of the tire 20, and thus of the second woven fabric 28, remains substantially constant. The radial distance, with respect to the axis of revolution YY' of the tire 20, of the first woven fabric 26 significantly increases during the conformation, as well as its circumferential length, and the angles formed by the first warp threadlike elements 64 and the first weft threadlike elements 66, with the circumferential direction XX' of the tire 20, which are initially equal to 45°, decrease and become at least equal to 10° and at most equal to 45°, after conformation, in this instance equal to B1=B2=38°. The radial distance, with respect to the axis of revolution YY' of the tire 20, of the second woven fabric 28 remains substantially constant during the conformation, its circumferential length does not vary substantially and the angles formed by the second warp threadlike elements 68 and the second weft threadlike elements 70, with the circumferential direction XX' of the tire 20, which are initially equal to 45°, remain substantially equal to 45°, after conformation; in this instance; B3=B4=45°.

The crown structure of revolution 55 is then wound radially on the outside of the first impregnated woven structure 25 forming the first, radially exterior, structure of revolution 25'.

Subsequently, the interior annular space 52 is depressurized down to ambient atmospheric pressure. The tire 20 is then obtained in the raw state. Finally, the tire 20 is cross-linked, for example by vulcanization, in order to obtain the tire 20 in the cured state.

Figure 11:
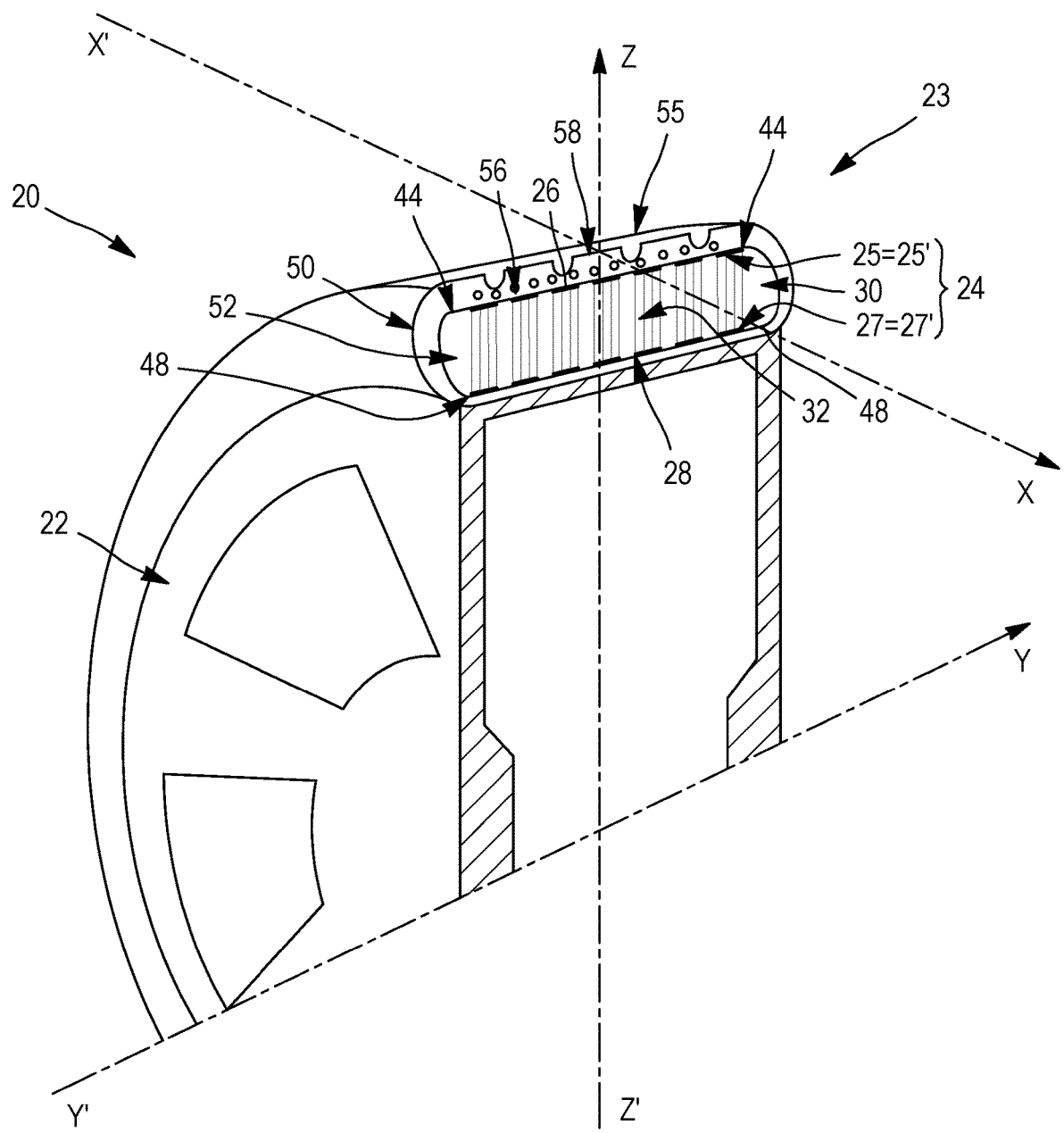
FIG. 11 is a view analogous to that of FIG. 1 of a tire according to a second embodiment of the invention.
Figure 12:
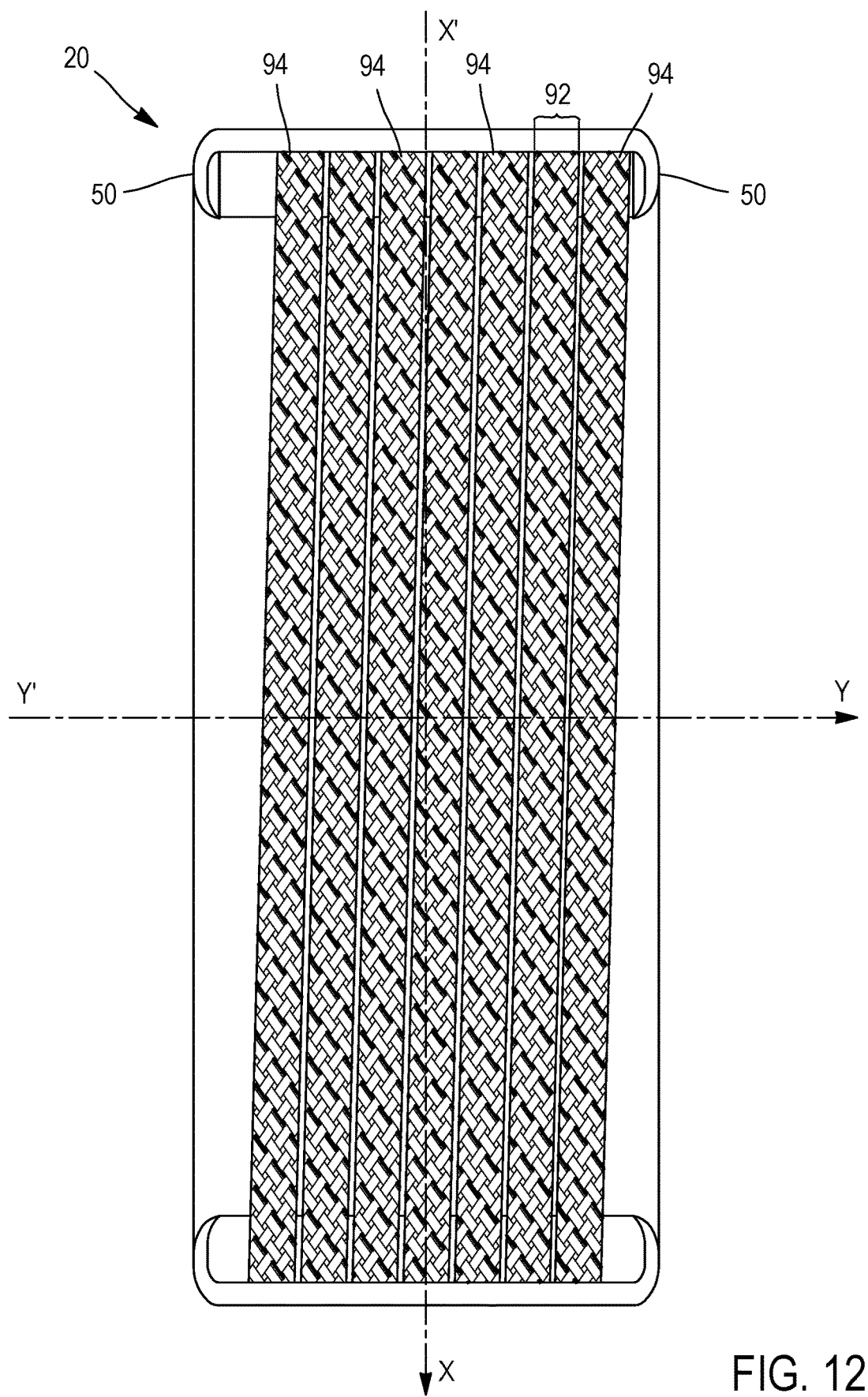
FIG. 12 is a view analogous to that of FIG. 7 of the tire of FIG. 11.

A tire 20 according to a second embodiment has been represented in FIGS. 11 and 12. The elements analogous to those represented in the preceding figures are denoted by identical references.

Unlike the tire according to the first embodiment, in the tire 20 according to the second embodiment, the assemblage 24 extends axially in a noncontinuous fashion between the two sidewalls 50 of the tire 20. The assemblage 24 extends circumferentially over several turns around the axis of revolution YY' of the tire 20 so as to form a winding of an axially noncontinuous assemblage strip 92.

Thus, as is illustrated in FIG. 12, the assembly 90 is wound around the axis of the tire 20 so as to form a helical winding of an assemblage strip 92, the axial portions 94 of the strip 92 being axially juxtaposed. Strip is understood to mean an assembly 90 having a limited axial width, at most equal to 30% of the axial width of the tread 58, and with a great length at least equal to twice the circumference of the tread 58, so that the strip to be laid can be stored in the form of a roll. Such a strip is thus unwound in a helix, having as axis of revolution the axis of revolution of the tire 20. The number of helical winding turns of the strip is determined by the total axial width of the targeted helical winding and by the density of bearing elements 32. The laying of the strip can be contiguous, that is to say that the strip portions are in contact in pairs by their axial edges, or non-contiguous, that is to say that the axial edges of the axial strip portions 94 are spaced out by a substantially nonzero space. The advantage of laying in strips is the absence of overlapping regions, or welding regions, in the circumferential direction, between axial strip portions, at the end of winding.

In a design of strip type, the binding surface area $S_E$ of the external face 43 of the first impregnated woven structure 25 forming the first, radially exterior, structure of revolution 25' of the tire 20 radially exterior woven fabric with the radially interior face 59 of the crown structure of revolution 55 is the sum of the binding surface areas of the juxtaposed strip 92 axial portions 94.

The strip 92 is wound helically around the axis of revolution of the tire 20 so that, before conformation, the first warp threadlike elements 64 and the first weft threadlike elements 66 of the first woven fabric 26 extend along a direction forming, with the circumferential direction XX', respectively an angle A1, A2 at least equal to 10° and at most equal to 45°, and so that the second warp threadlike elements 68 and the second weft threadlike elements 70 of the second, radially interior, woven fabric 28 extend along a direction forming, with the main general direction of the second, radially interior, woven fabric 28, respectively an angle A3, A4 at least equal to 10° and at most equal to 45°. In the case in point, A1=A2=A3=A4=45°.

As in the first embodiment, after conformation, the angles formed by the first warp threadlike elements 64 and the first weft threadlike elements 66, with the circumferential direction XX', which are initially equal to 45°, decrease and become at least equal to 10° and at most equal to 45°, after conformation, in this instance equal to B1=B2=38°. The angles formed by the second warp threadlike elements 68 and the second weft threadlike elements 70, with the circumferential direction XX', of the tire 20, which are initially equal to 45°, remain substantially equal to 45°.

The invention is not limited to the embodiments described above.

It will be possible to envisage the embodiment in which:
- each threadlike bearing element is coated with at least one layer of a third adhesive composition,
- each coated threadlike bearing element is then heat treated, so as to crosslink the third adhesive composition,
- each coated and heat-treated threadlike bearing element is then assembled with the first and second threadlike elements, so as to form the assemblage.

Thus, in this embodiment, each threadlike bearing element is coated with at least one layer of a third crosslinked adhesive composition and is obtained after a stage of individual coating of each threadlike bearing element by the layer of the third adhesive composition, followed by a stage of individual heat treatment of each coated threadlike bearing element.

In this embodiment, during the stage of formation of the assemblage, each coated and heat-treated threadlike bearing element is assembled with the first and second coated and heat-treated threadlike elements, so as to form the assemblage.

The invention claimed is:

1. A process for manufacturing a tire assemblage that includes a first woven fabric including first threadlike elements, a second woven or knitted fabric including second threadlike elements, and a bearing structure including threadlike bearing elements connecting the first woven fabric and the second woven or knitted fabric together, the process comprising steps of:
   - coating each first threadlike element with at least one layer of a first adhesive composition, to form coated first threadlike elements;
   - coating each second threadlike element with at least one layer of a second adhesive composition, to form coated second threadlike elements;
   - heat treating each coated first threadlike element and each coated second threadlike element to crosslink the first adhesive composition and the second adhesive composition, to form coated and heat-treated first and second threadlike elements; and
   - assembling each coated and heat-treated first threadlike element and each coated and heat-treated second threadlike element with the threadlike bearing elements, so as to form part or all of the tire assemblage,
   wherein each threadlike bearing element includes:
   - at least one threadlike bearing portion extending between the first woven fabric and the second woven or knitted fabric, and
   - at least one pair of first and second threadlike anchor portions for anchoring each threadlike bearing element respectively in the first woven fabric and the second woven or knitted fabric, prolonging the at least one threadlike bearing portion respectively into the first woven fabric and the second woven or knitted fabric,
   wherein the first woven fabric includes intertwinings of a first family of the first threadlike elements, which are substantially parallel to one another, and a second family of the first threadlike elements, which are substantially parallel to one another,
   wherein each first threadlike anchor portion is wound, at least in part, around more than one of the first threadlike elements of at least one of the first and second families of the first threadlike elements of the first woven fabric,
   wherein a smallest dimension E of a mean section $S_p$ the threadlike bearing portion is equal to 0.02 times or less than a maximum distance between an internal face of the first woven fabric and an internal face of the second woven or knitted fabric, and
   wherein an aspect ratio K of the mean section $S_p$ the threadlike bearing portion is equal to 3 or less, where K=L/E and L is a largest dimension of the mean section $S_p$ the threadlike bearing portion.

2. The process according to claim 1, wherein the crosslinked first and second adhesive compositions are substantially identical.

3. The process according to claim 1, wherein each first and second threadlike element is a textile.

4. The process according to claim 1, wherein each threadlike bearing element is a textile.

5. The process according to claim 1, wherein each threadlike bearing element extends along a length thereof in an alternating pattern from the first woven fabric towards the second woven or knitted fabric and then from the second woven or knitted fabric towards the first woven fabric.

6. The process according to claim 1, wherein each threadlike bearing element is interlaced with each of the first woven fabric and the second woven or knitted fabric.

7. The process according to claim 1, wherein the second woven or knitted fabric is a second woven fabric that includes intertwinings of a first family of the second threadlike elements, which are substantially parallel to one another, and a second family of the second threadlike elements, which are substantially parallel to one another.

8. The process according to claim 7, wherein each second threadlike anchoring portion is wound, at least in part, around at least one of the second threadlike elements of at least one of the first and second families of the second threadlike elements of the second woven fabric.

9. The process according to claim 7, wherein:
   - the second woven fabric extends along a main general direction, and
   - the second threadlike elements of at least one of the first and second families extend along a direction forming, with the main general direction of the second woven fabric, an angle at least equal to 10° and at most equal to 45°.

10. The process according to claim 1, wherein:
    - the first woven fabric extends along a main general direction, and
    - the first threadlike elements of at least one of the first and second families extend along a direction forming, with the main general direction of the first woven fabric, an angle at least equal to 10° and at most equal to 45°.

11. The process according to claim 1, wherein each first threadlike element is coated directly with a layer of a first adhesion primer, and the layer of the first adhesion primer is coated with the at least one layer of the first adhesive composition.

12. The process according to claim 1, wherein each second threadlike element is coated directly with a layer of a second adhesion primer, and the layer of the second adhesion primer is coated with the at least one layer of the second adhesive composition.

13. The process according to claim 1,
    wherein the process further comprises steps of:

coating each threadlike bearing element with at least one layer of a third adhesive composition, to form a coated threadlike bearing element;

heat treating each coated threadlike bearing element to crosslink the third adhesive composition, to form a coated and heat-treated threadlike bearing element; and assembling each coated and heat-treated threadlike bearing element with the first and second coated and heat-treated threadlike elements, so as to form part or all of the assemblage.

* * * * *